O. A. WHEELER.
AUTOMATIC SEWING MACHINE.
APPLICATION FILED SEPT. 10, 1912.
1,218,500.
Patented Mar. 6, 1917.
22 SHEETS—SHEET 1.
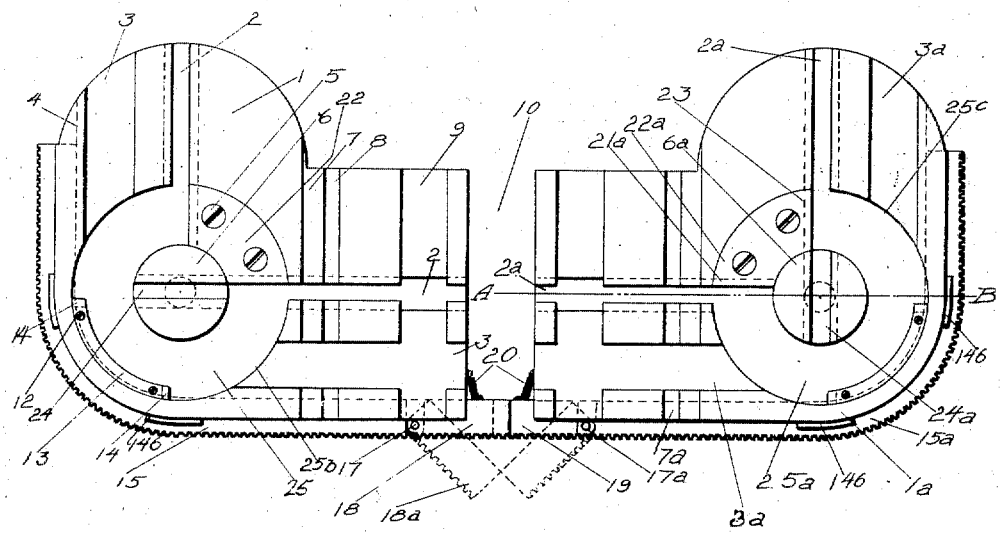
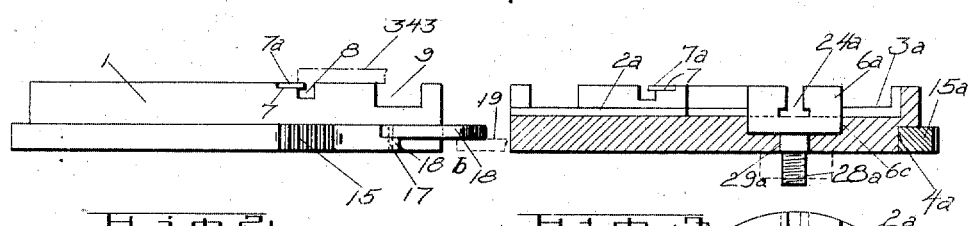
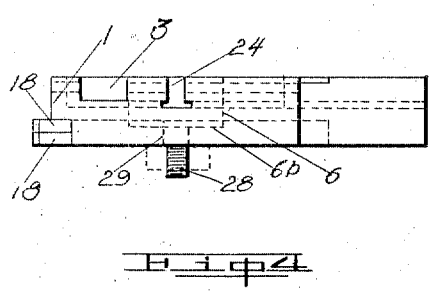
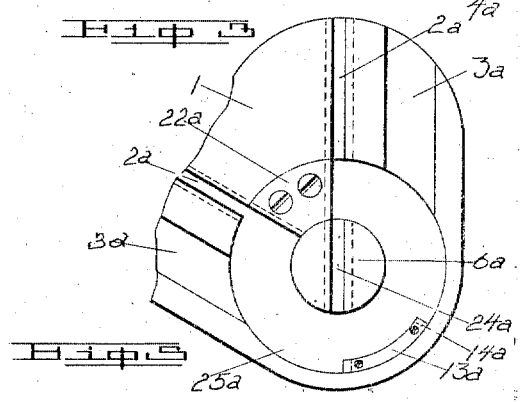
WITNESSES
INVENTOR
Omar A. Wheeler
BY
ATTORNEY

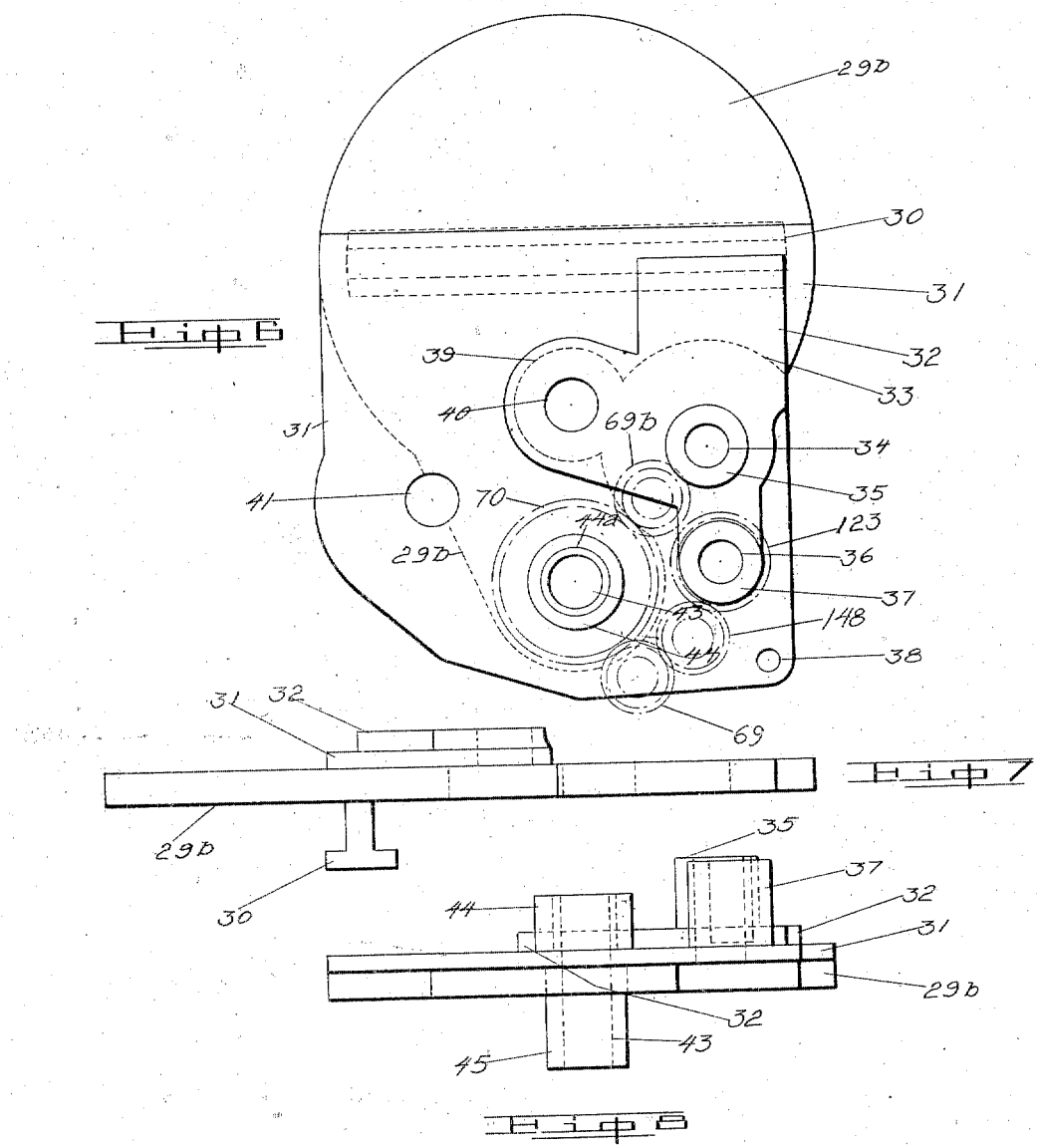

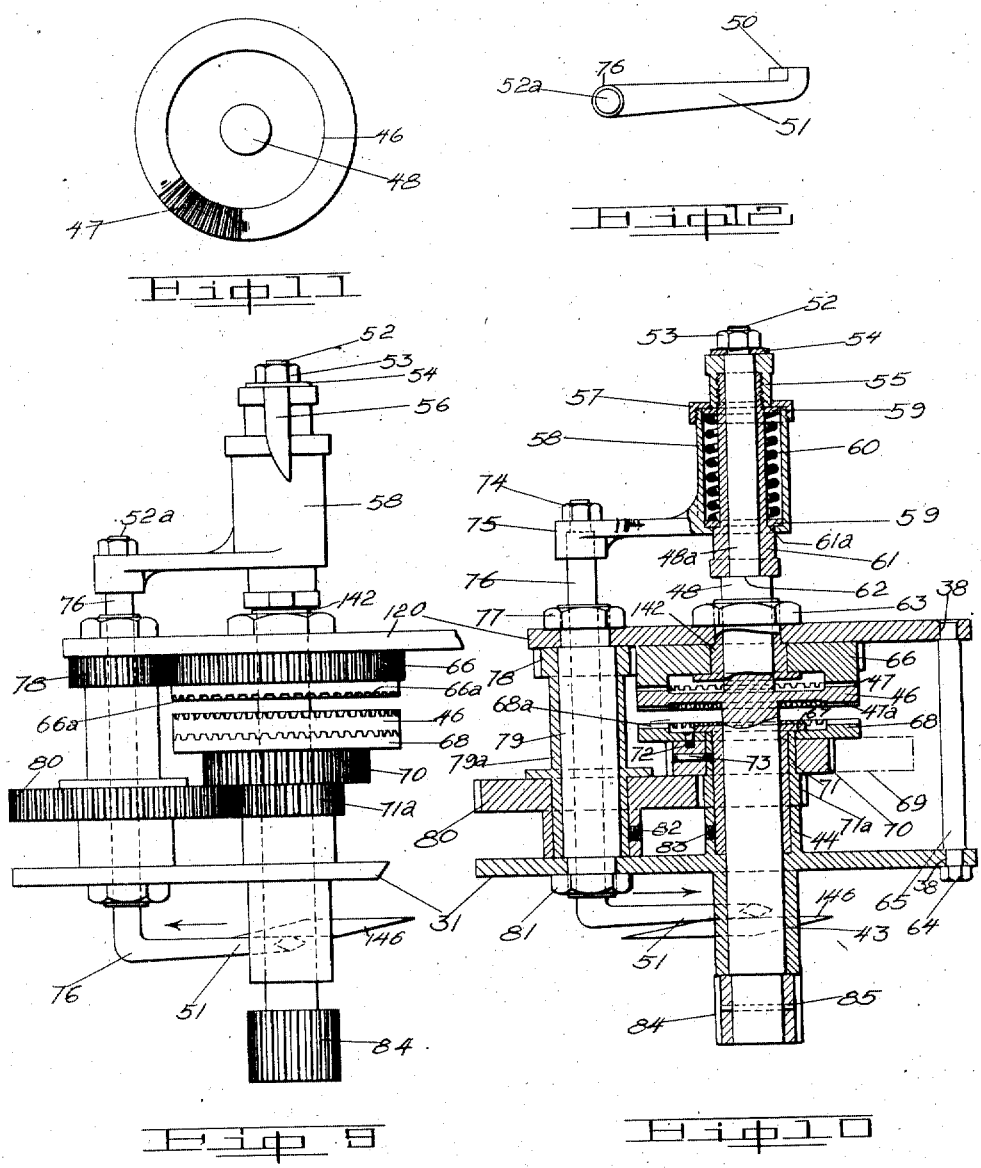

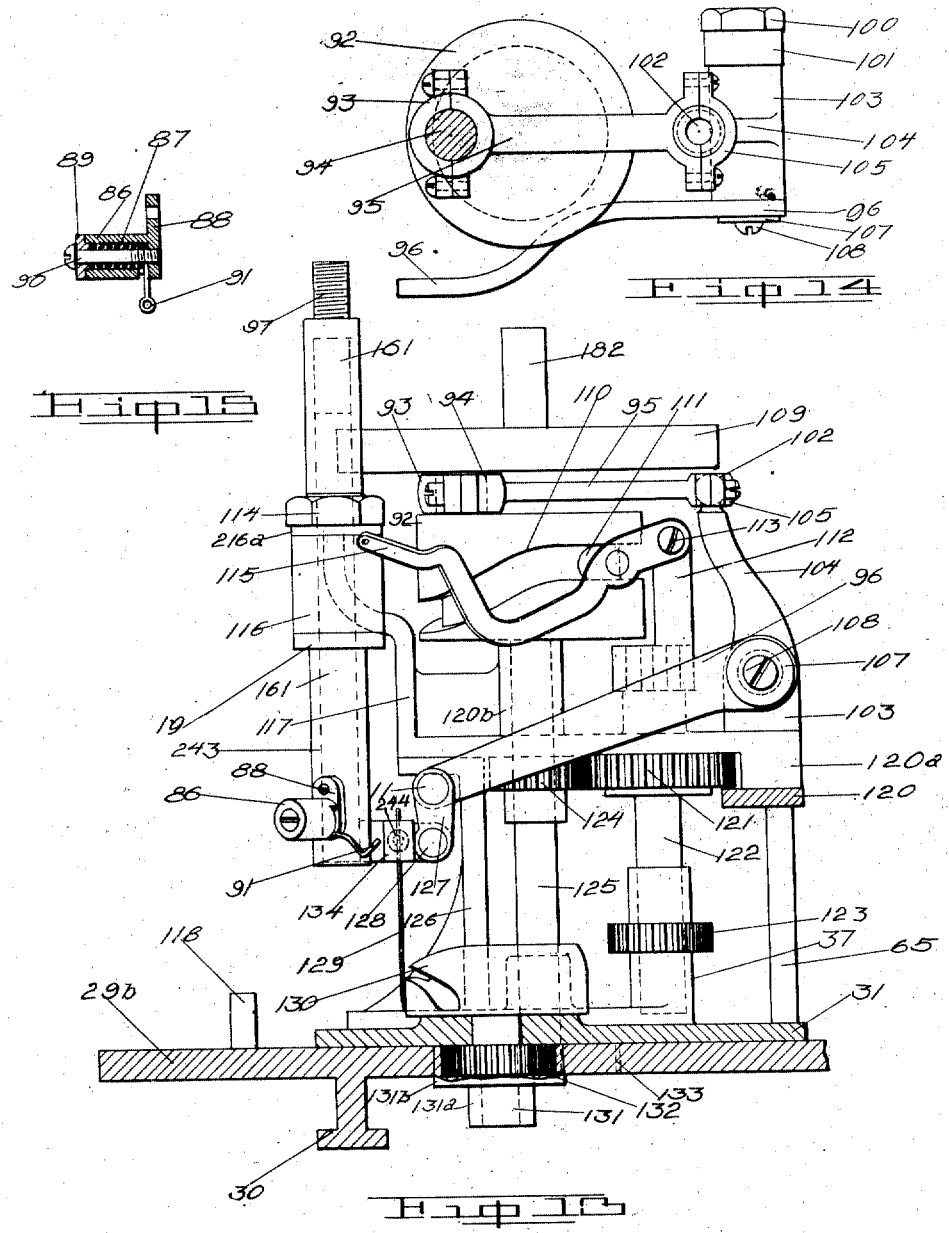

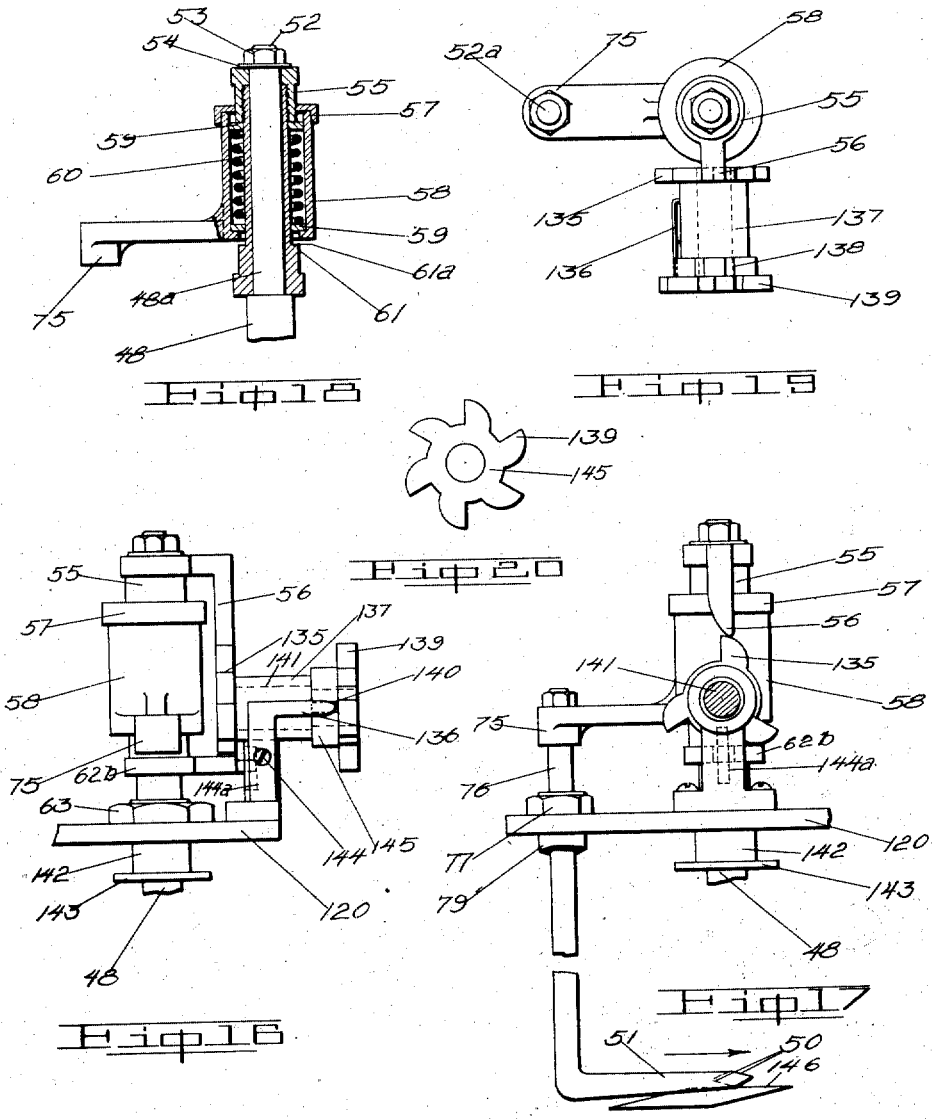

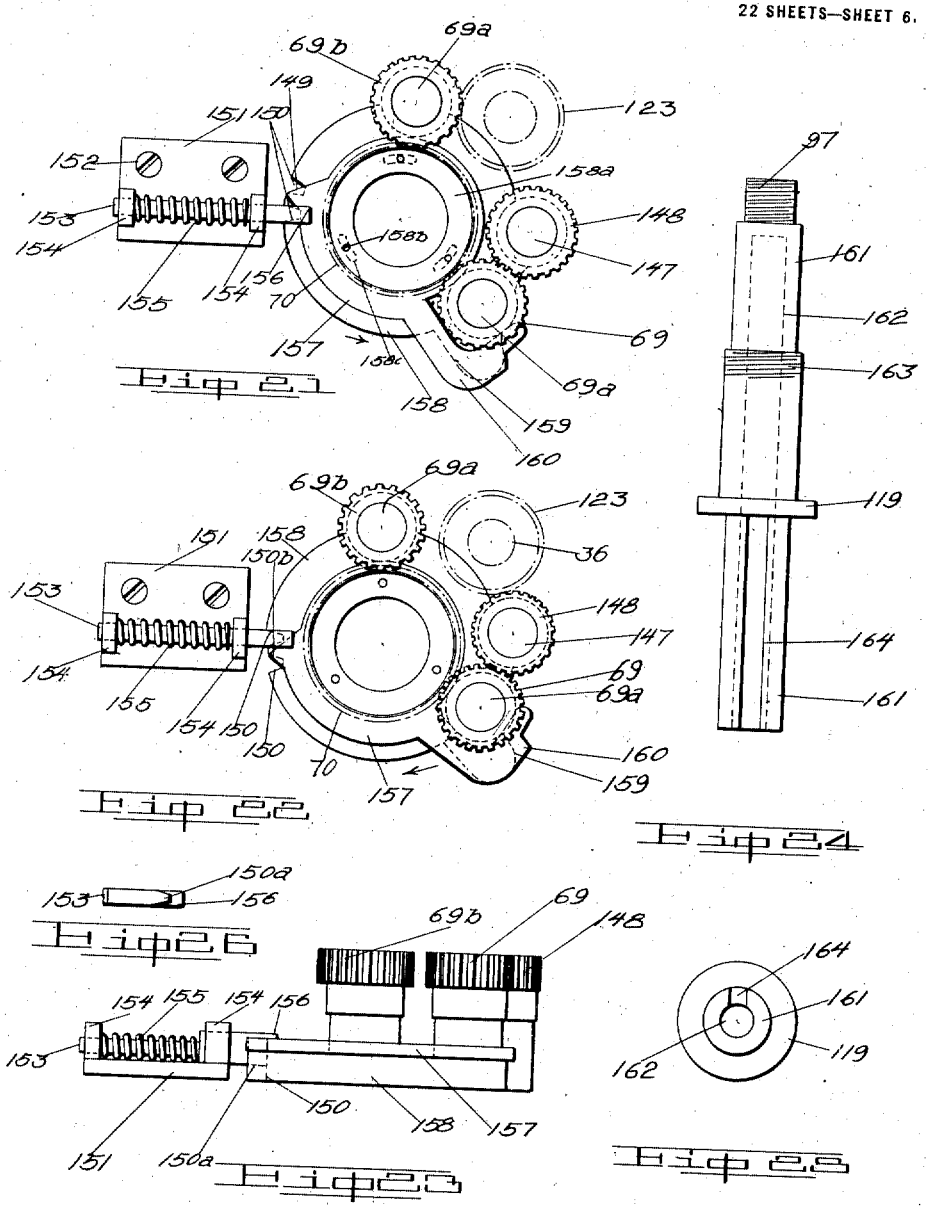

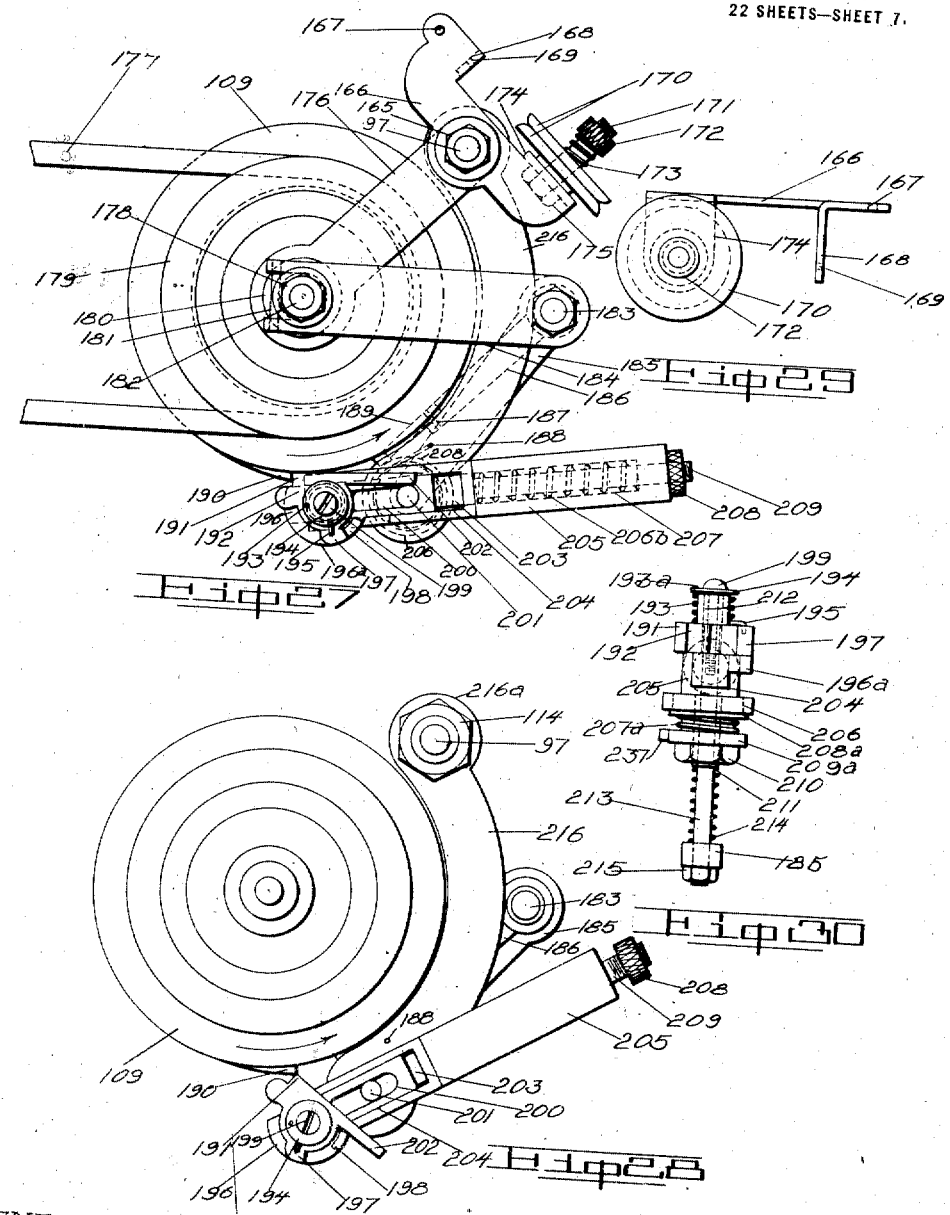

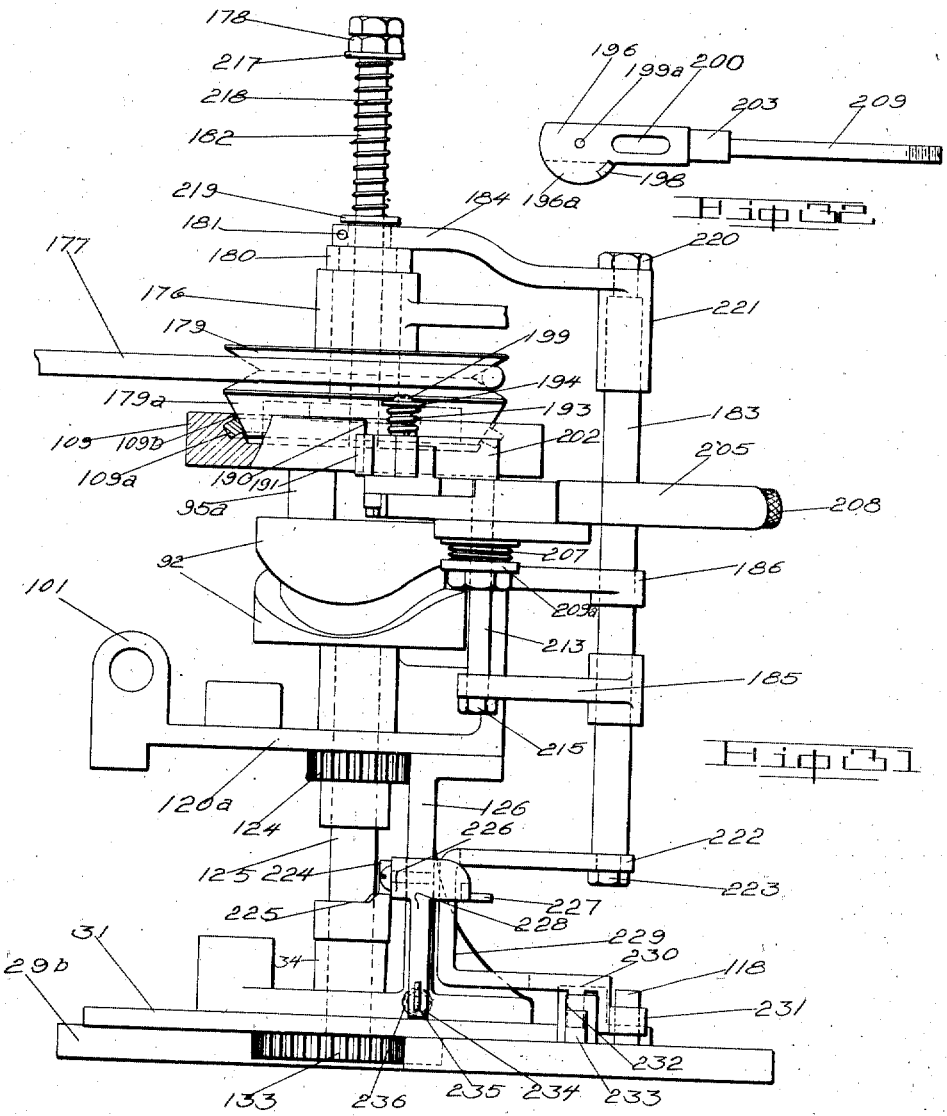

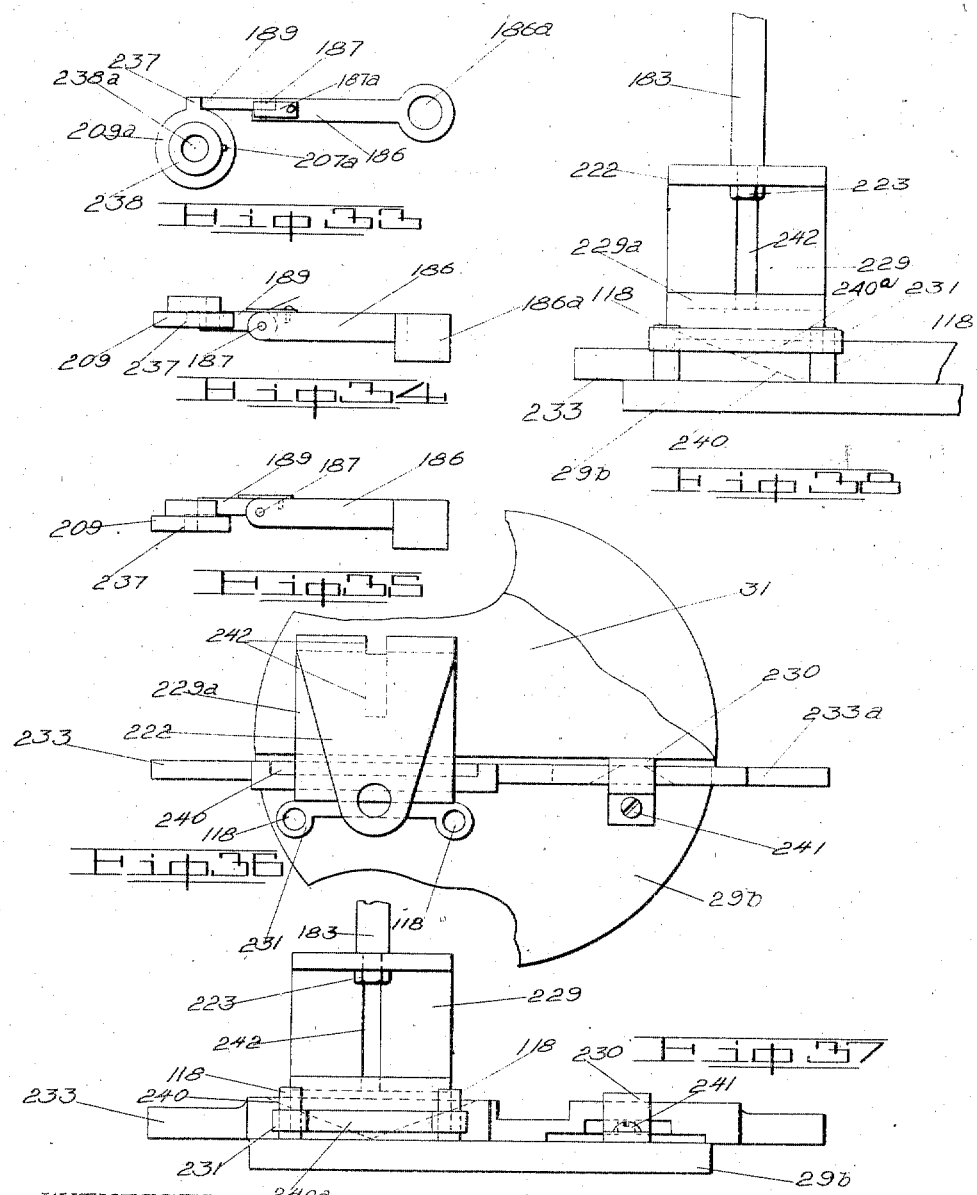

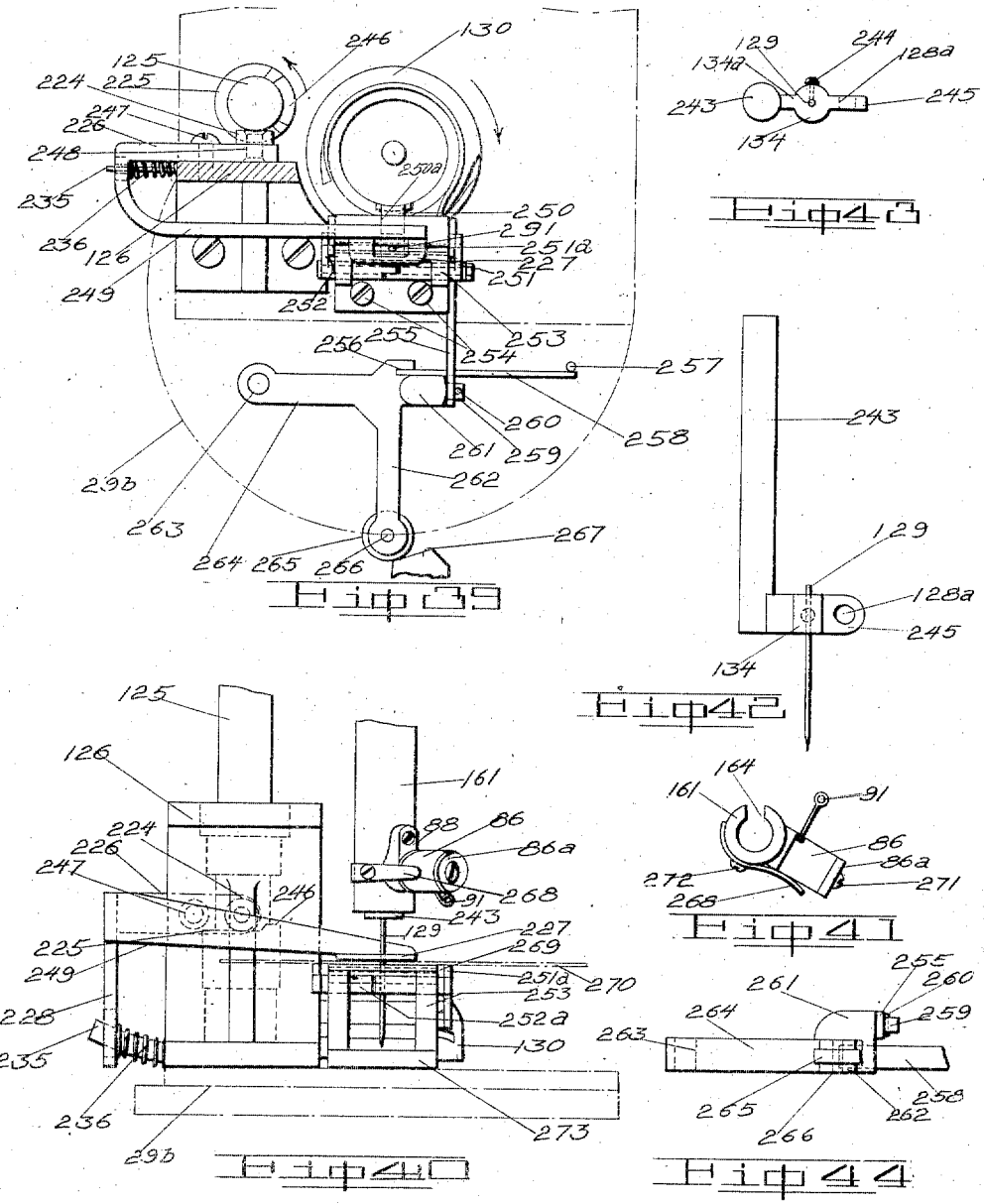

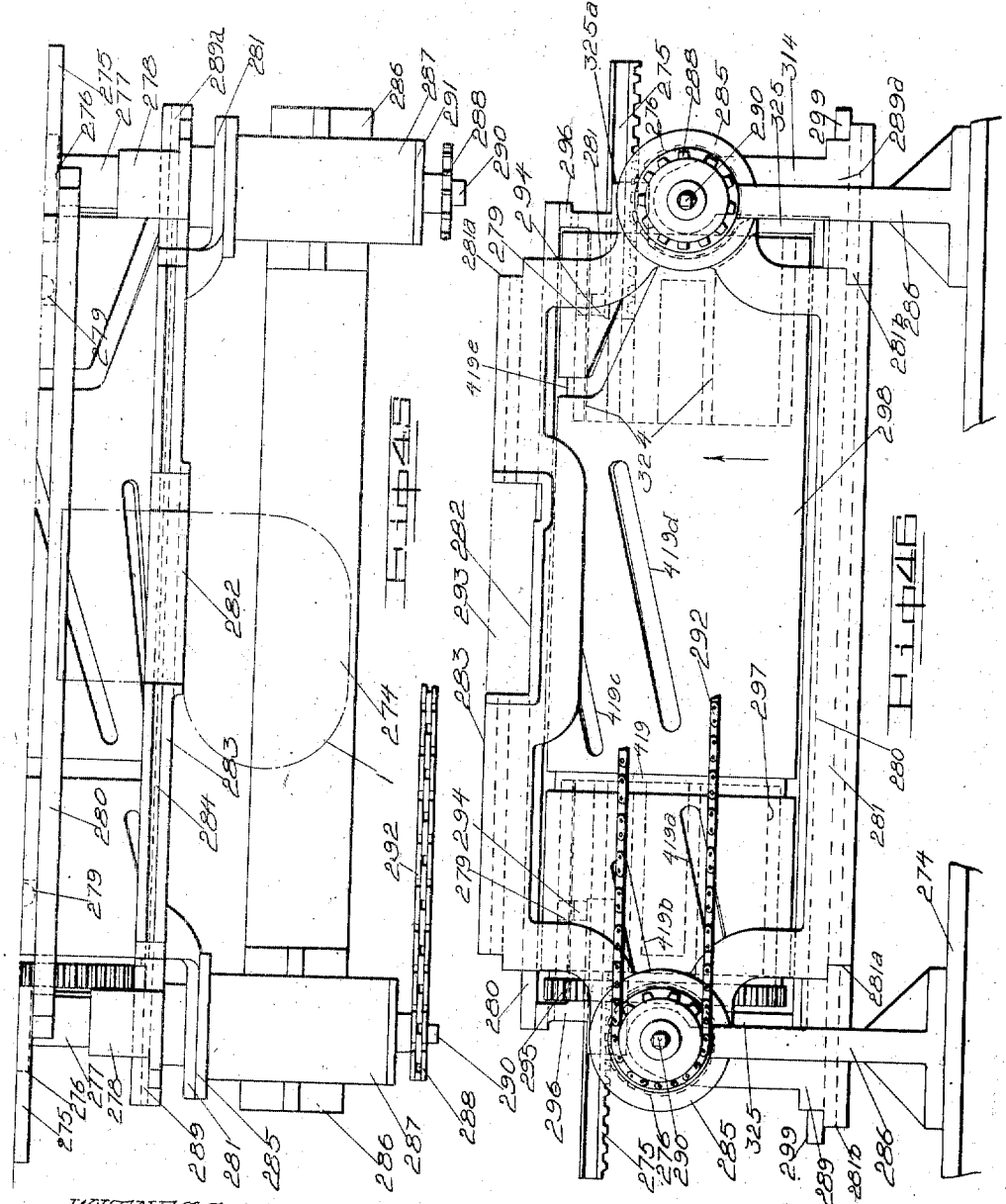

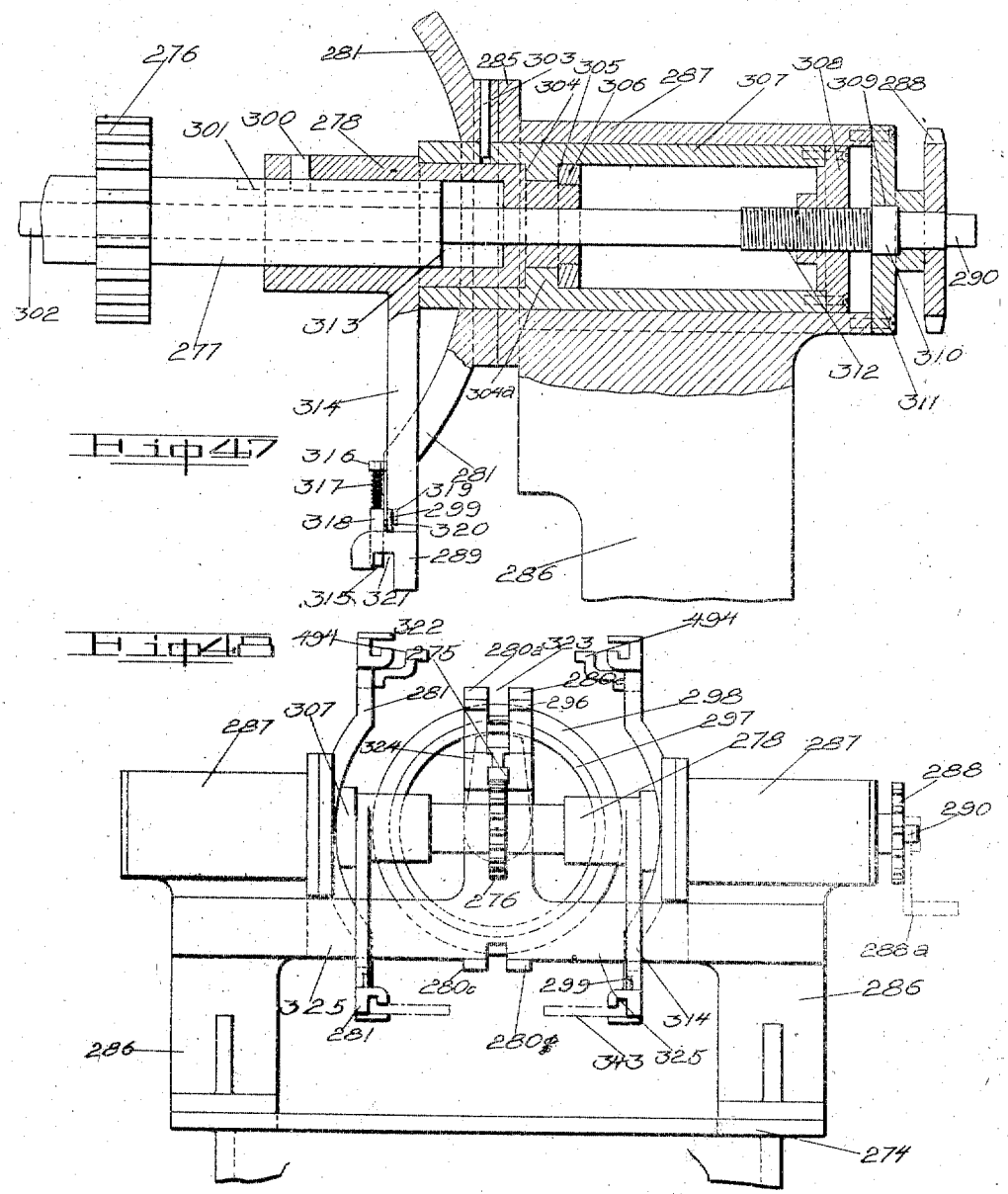

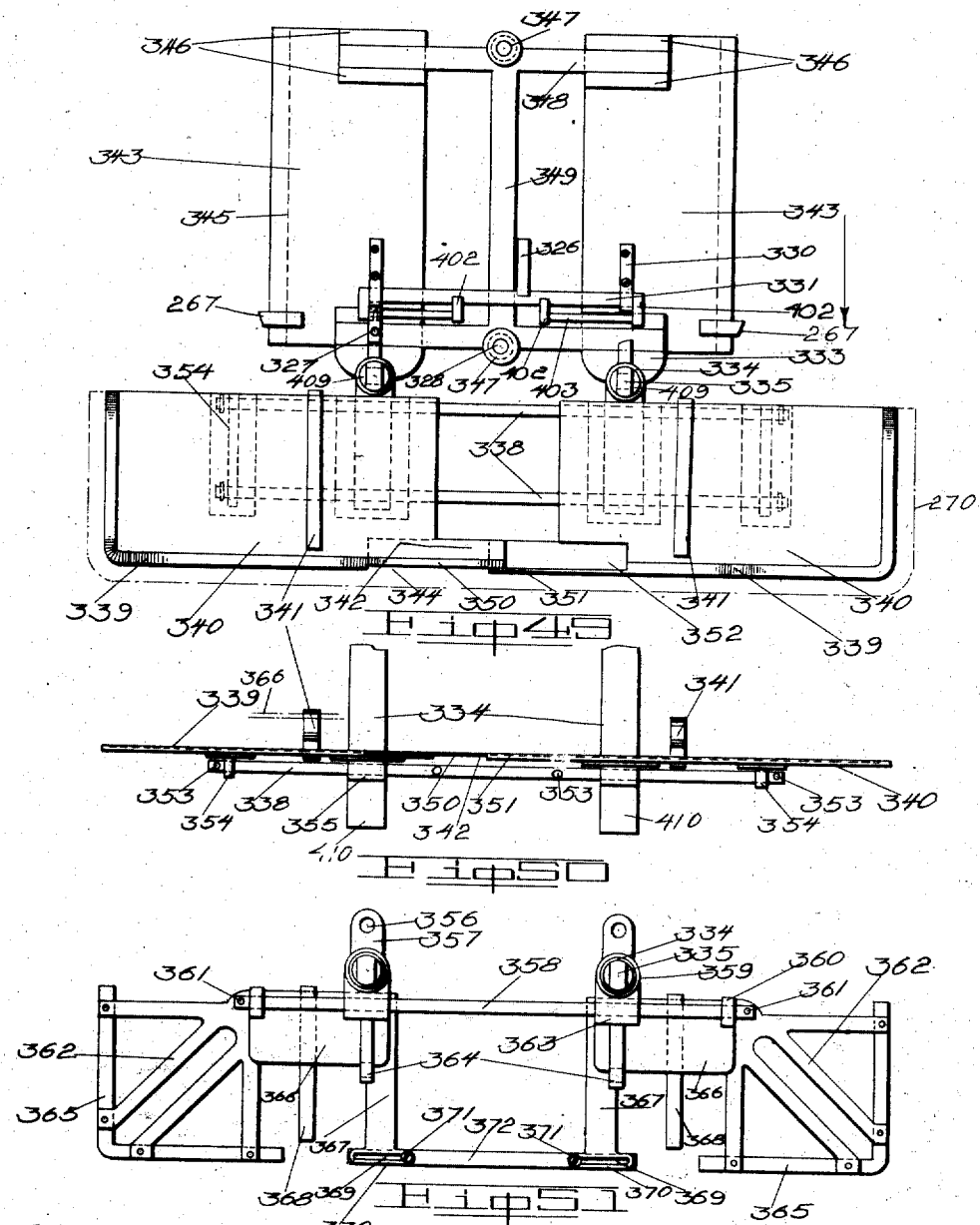

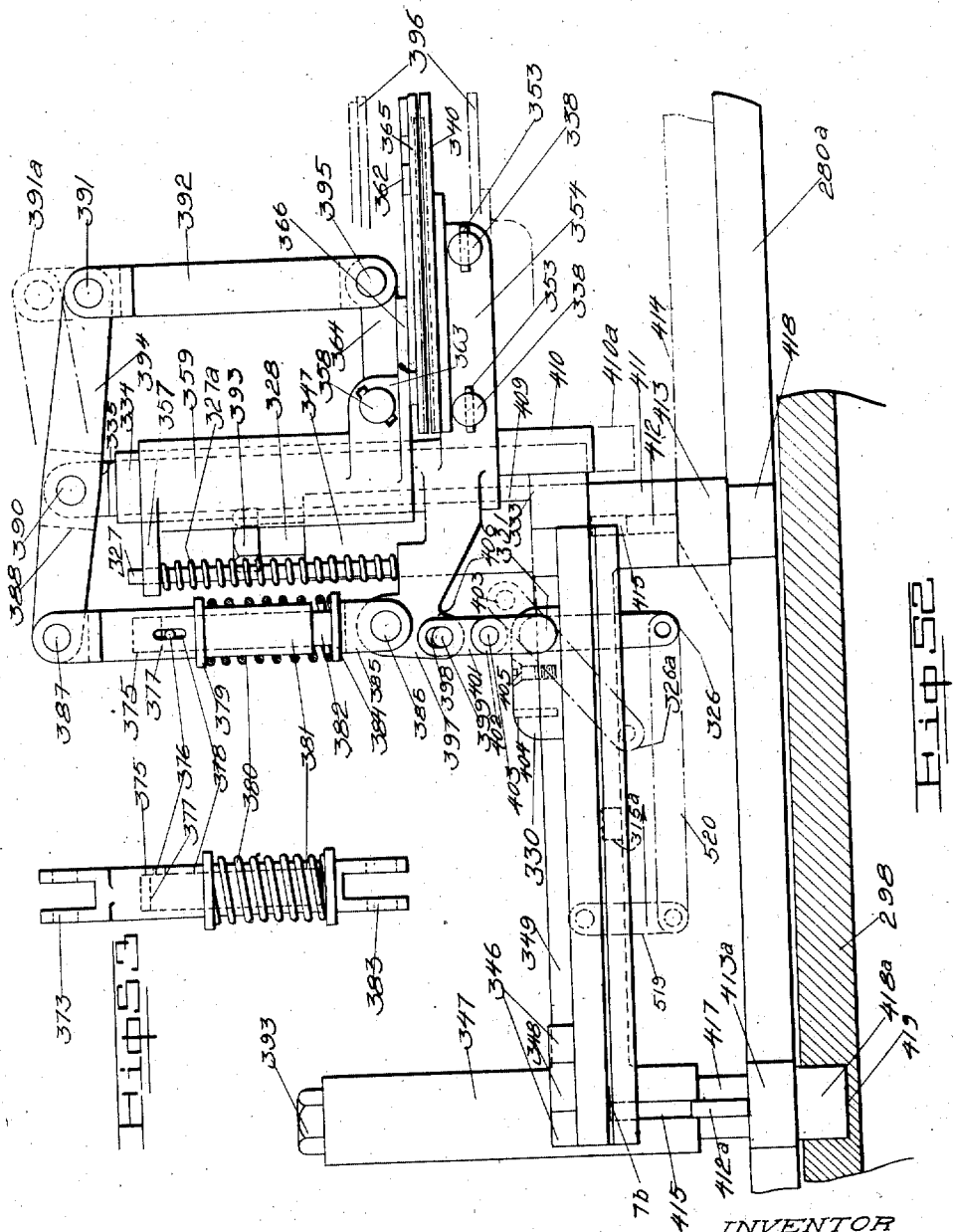

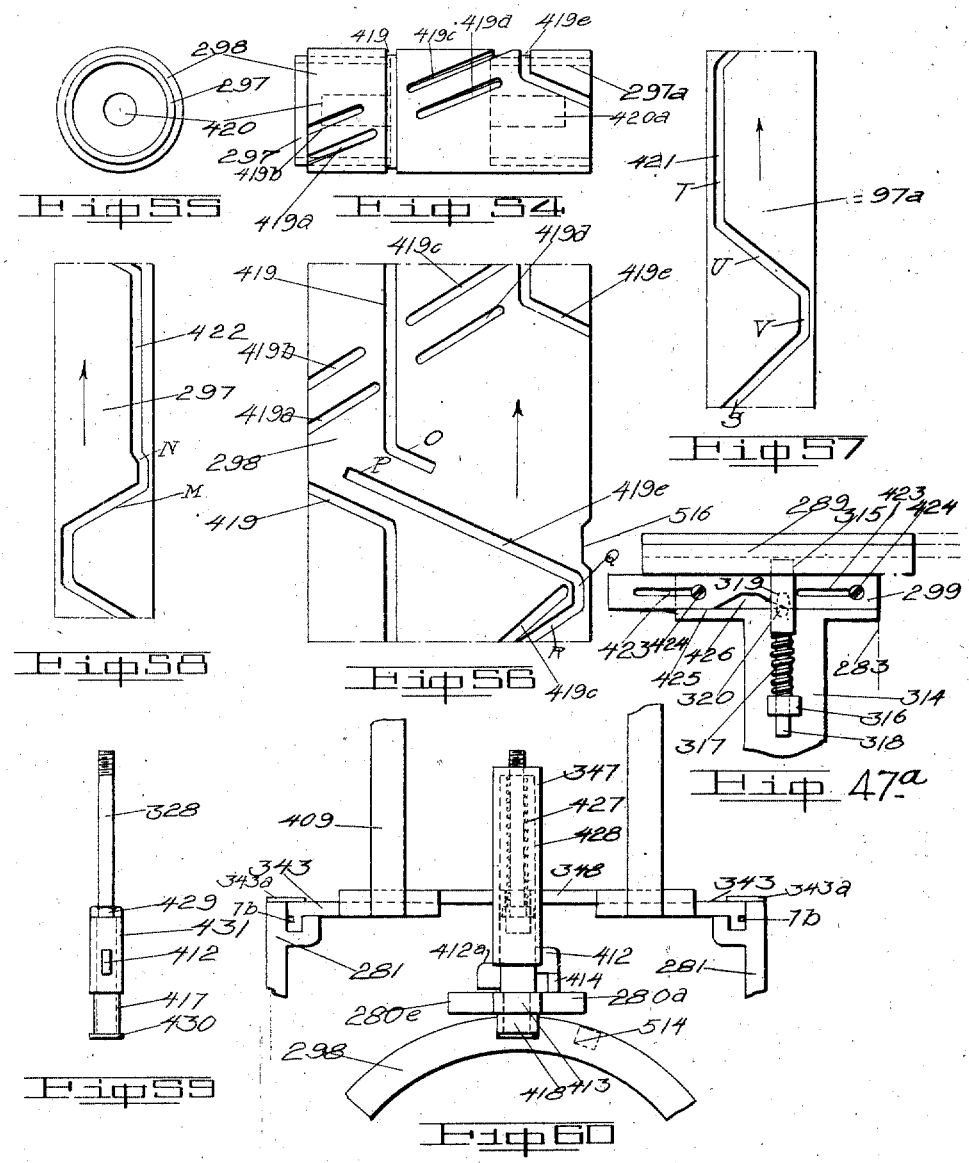

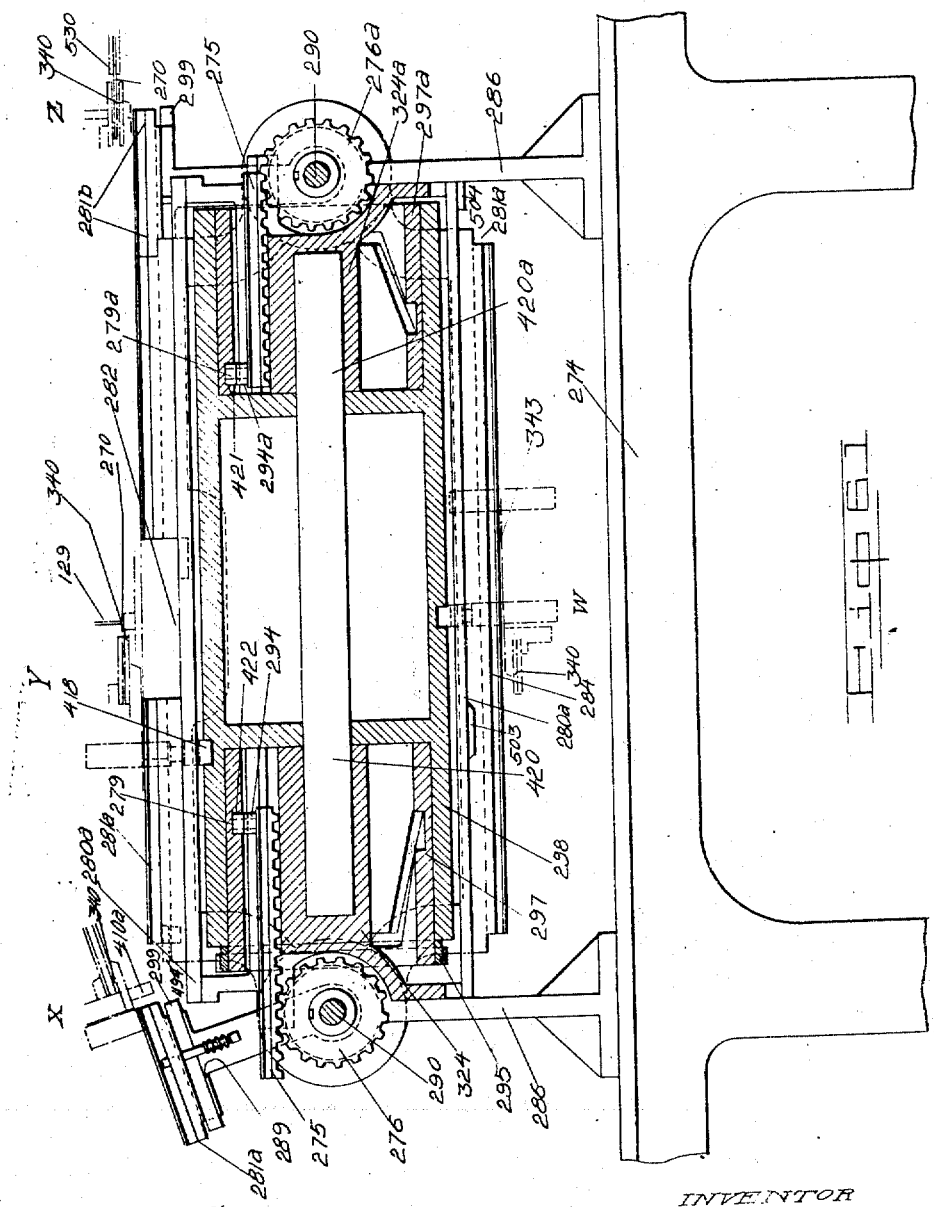

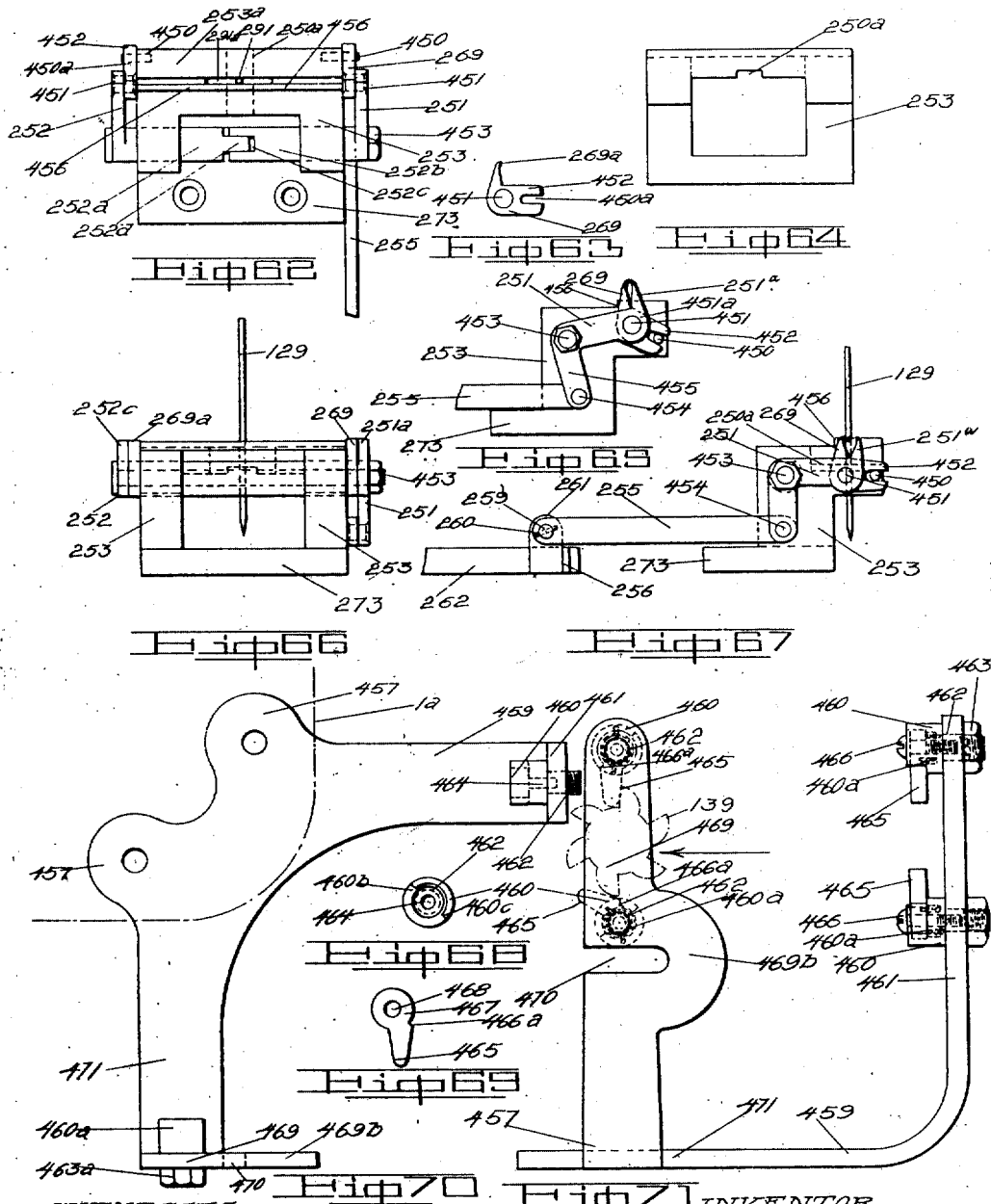

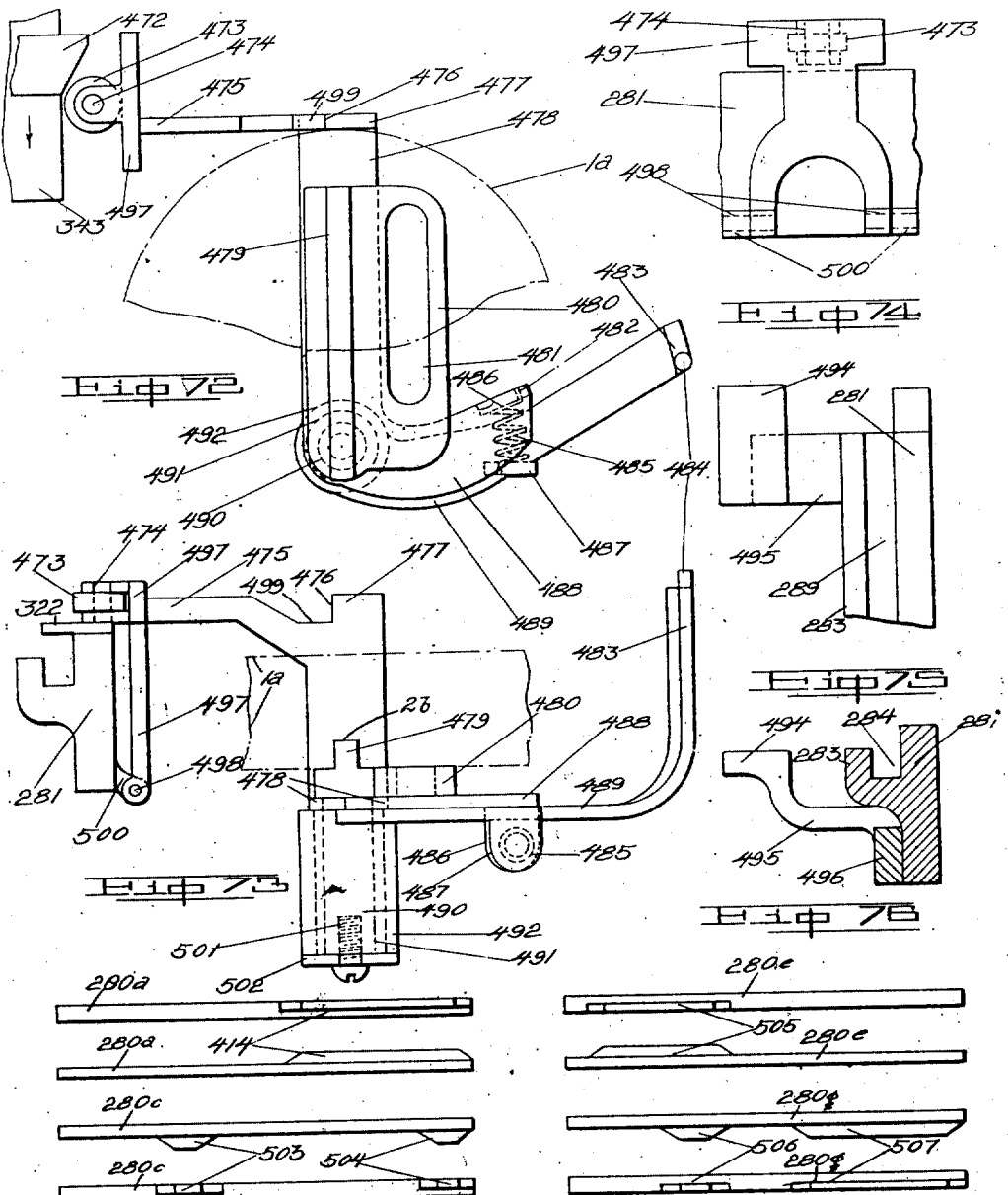

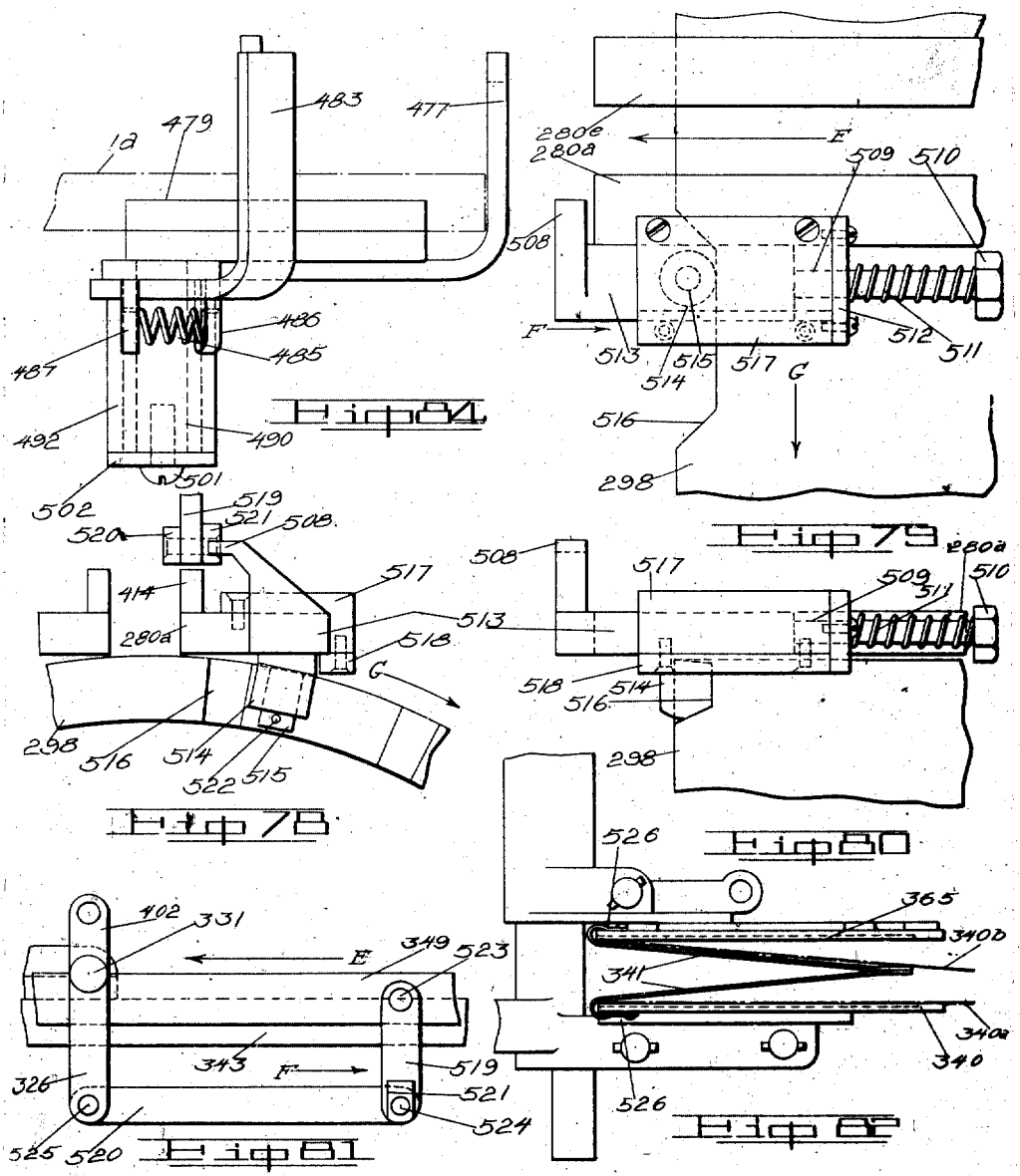

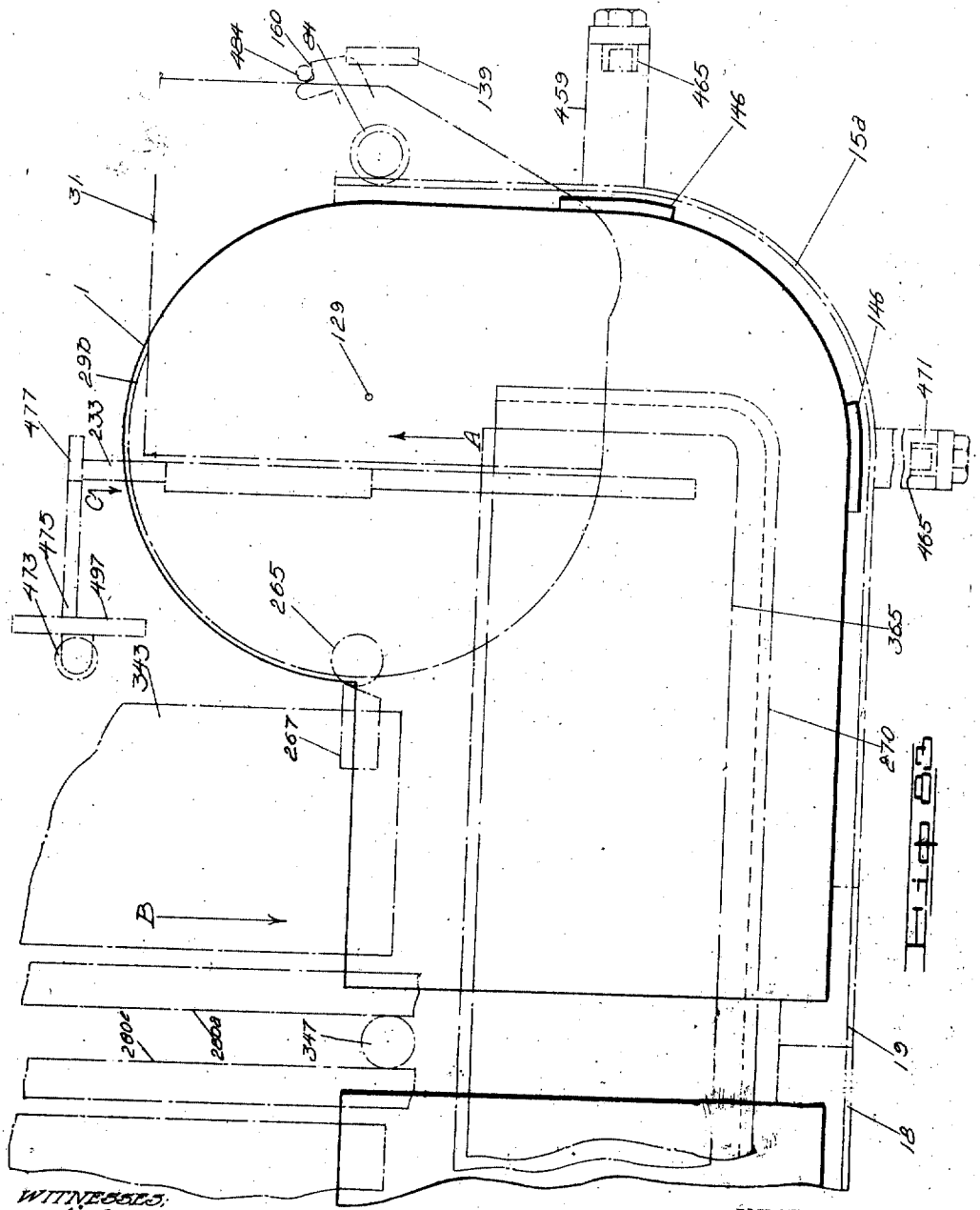

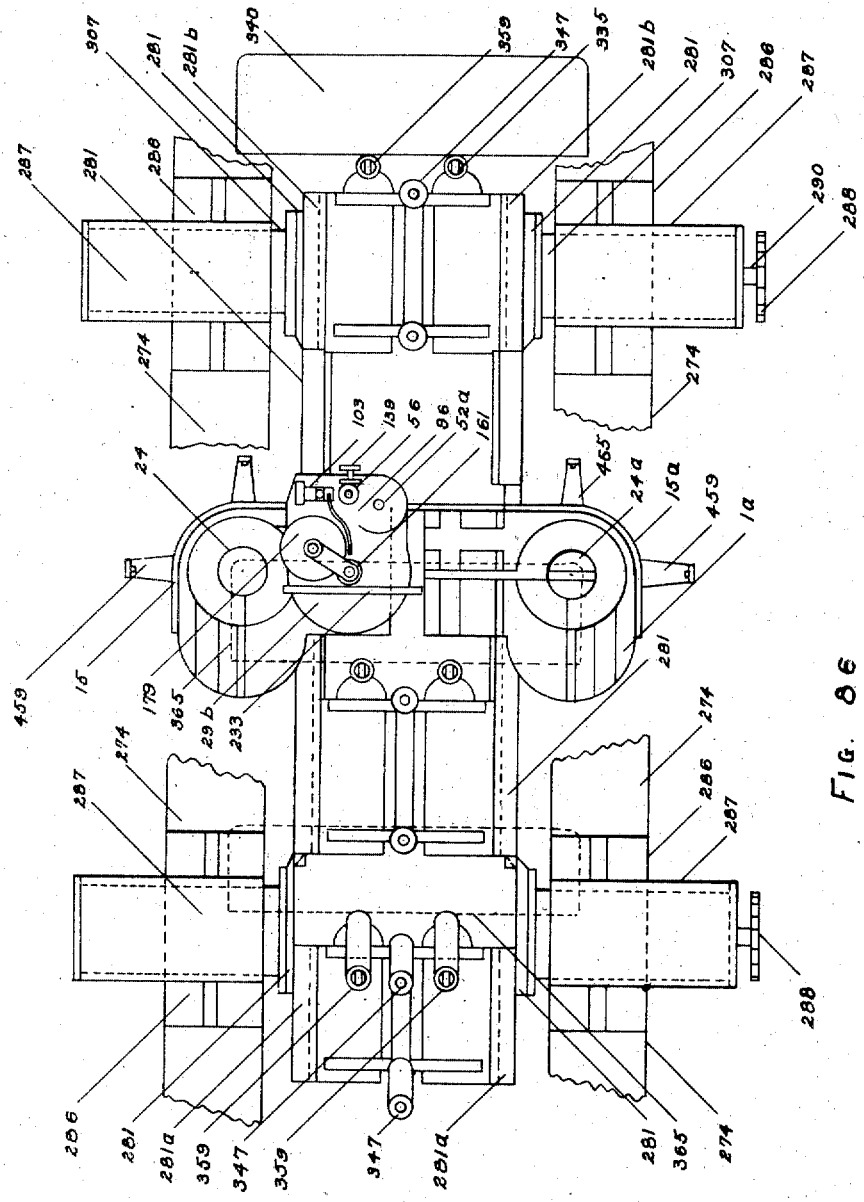

UNITED STATES PATENT OFFICE.

OMAR A. WHEELER, OF PORTLAND, OREGON, ASSIGNOR, BY DIRECT AND MESNE ASSIGNMENTS, TO WHEELER AUTOMATIC MACHINE CO., OF PORTLAND, OREGON, A CORPORATION OF OREGON.

AUTOMATIC SEWING-MACHINE.

1,218,500.   Specification of Letters Patent.   Patented Mar. 6, 1917.

Application filed September 10, 1912. Serial No. 719,656.

*To all whom it may concern:*

Be it known that I, OMAR A. WHEELER, a citizen of the United States, residing at Portland, in the county of Multnomah and State of Oregon, have invented certain new and useful Improvements in Automatic Sewing-Machines, of which the following is a specification.

This invention relates to improvements in automatic sewing machines, and has for its objects to provide a sewing machine which will receive a series of articles, each composed of a plurality of plies and sew them in a certain manner. A further object is to provide a reciprocating machine which will receive each article singly and sew it during one trip of the sewing machine proper, the succeeding article being sewn in the return movement thereof. A still further object is to deliver said articles when sewn to other mechanism such as that embraced in my application No. 639,388, mechanism for turning cuffs and the like, for subsequent operations. These and other objects will be accomplished by the mechanism illustrated in the accompanying drawings, in which—

Figure 1 is a plan view of the guide base.

Fig. 2 is an elevation of the left half of Fig. 1.

Fig. 3 is a vertical sectional view on the line A—B of Fig. 1.

Fig. 4 is a right hand end view of Fig. 2.

Fig. 5 is a modification of the guide base showing a variation of the pivot angle from a right angle.

Fig. 6 is a plan view of the moving base of the machine.

Fig. 7 is a side elevation of same, with portions removed.

Fig. 8 is an end elevation of Fig. 6.

Fig. 9 is an elevation of the driving mechanism of the machine.

Fig. 10 is a vertical sectional view of same, showing the clutch in upward position, and the parts moving in the opposite direction.

Fig. 11 is a detail of the clutch made integrally on the shaft 48.

Figure 85:
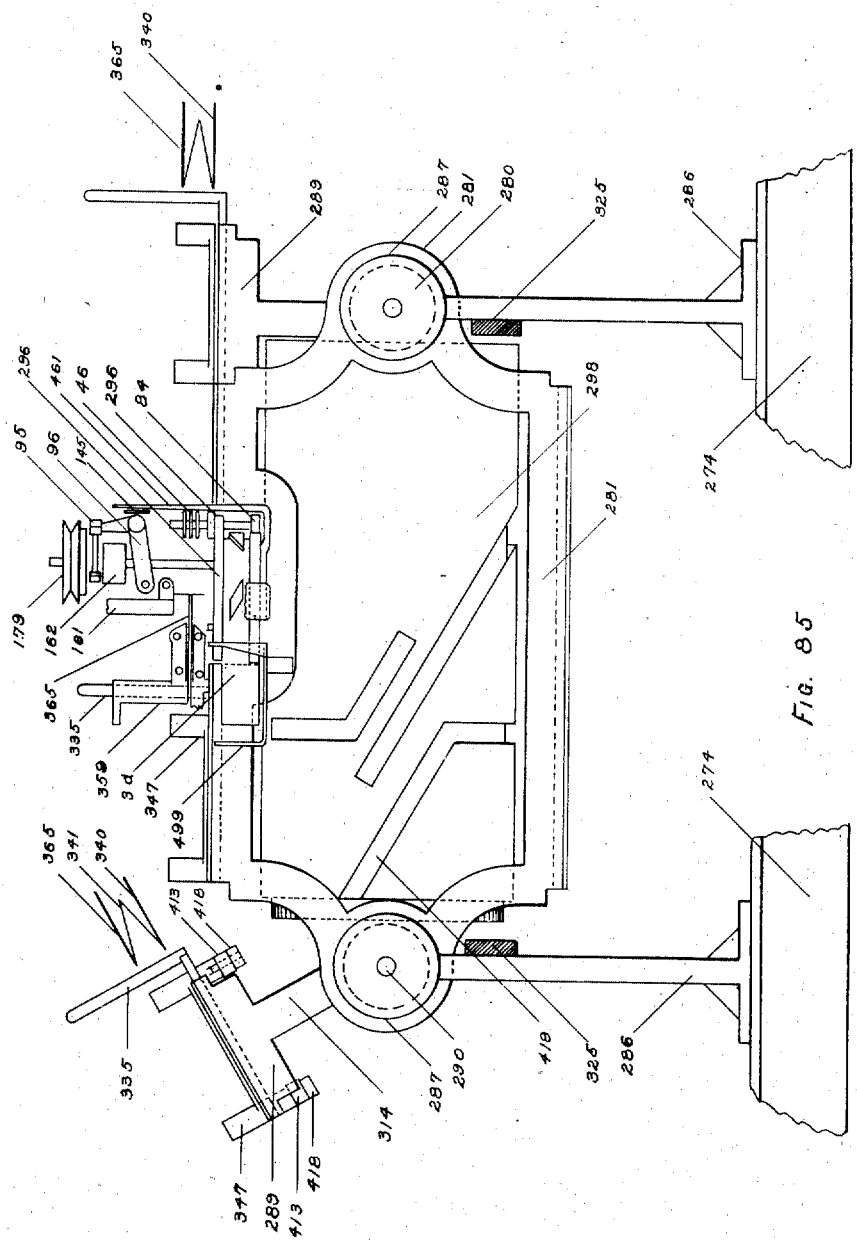

Fig. 12 is a top view of the arm 51 for reciprocating the shell 58 against the spring 60.

Fig. 13 is an elevation of the operative mechanism of the machine showing the base in section.

Fig. 14 is a top view of the crank and pitman.

Fig. 15 is a vertical section of the thread take-up.

Fig. 16 is a side elevation of a portion of the clutch-operating mechanism.

Fig. 17 is a front elevation of same.

Fig. 18 is a vertical section through the shell 58.

Fig. 19 is a plan view of Fig. 16.

Fig. 20 is a detail of the trip-wheel 139.

Fig. 21 is a top view of the reversing mechanism.

Fig. 22 shows the same in reverse position.

Fig. 23 is an elevation of Fig. 21.

Fig. 24 is an elevation of the needle-bar support.

Fig. 25 is a bottom view of same.

Fig. 26 is a detail of the terminus of the catch bar 153.

Fig. 27 is a plan view showing the driving mechanism and the stop mechanism in engagement, also the thread guiding and tensioning devices.

Fig. 28 shows the automatic stop in releasing position.

Fig. 29 shows the thread guide and tensioning devices.

Fig. 30 is a front elevation of the stop device.

Fig. 31 is a side elevation of the mechanism shown in Fig. 27, with portions omitted.

Fig. 32 is a detail of the spring-bar of the automatic stop.

Figs. 33, 34 and 35 show different views of a pawl and stop for holding the catch mechanism out of engagement.

Fig. 36 is a top view of a portion of the stop mechanism.

Fig. 37 is a front elevation of same in down position.

Fig. 38 shows the same, in part, in upper position.

Fig. 39 is a plan view showing the thread cutting mechanism and the presser foot, with connections.

Fig. 40 is a front elevation of same with portions removed.

Fig. 41 is bottom view of the needle bar guide.

Fig. 42 is a side elevation of the needle bar.

Fig. 43 is a bottom view of same.

Fig. 44 is a front elevation of a portion of the thread cutting device.

Fig. 45 is a top view of one half of the main frame.

Fig. 46 is a side elevation of same showing the interior parts.

Fig. 47 is a vertical sectional view through one of the supports 287 of Fig. 48.

Fig. 47$^a$ is a detail view of parts shown in Fig. 47.

Fig. 48 is a front end elevation of the frame work.

Fig. 49 is a plan view of the lower clamp member and the clamp carriage.

Fig. 50 is an edge view of the lower member of the clamp.

Fig. 51 is a plan view of the upper member of the clamp.

Fig. 52 is a side elevation of the clamp and carriage.

Fig. 53 is a detail view of a spring link.

Fig. 54 is a side elevation of a cam drum.

Fig. 55 is an end view of same showing an inner bushing.

Fig. 56 shows a lay out of the drum.

Fig. 57 is a lay out of the bushing 297$^a$.

Fig. 58 is a similar view of bushing 297.

Fig. 59 is a detail of a journal bar shown in Fig. 60.

Fig. 60 is a detail view showing a portion of a clamp carriage and a portion of the cam drum.

Fig. 61 is a vertical sectional view, taken lengthwise, of the main cam drum frame.

Fig. 62 is a plan view of a needle plate and thread cutting device.

Fig. 63 is a detail of the passive member of the cutting jaws.

Fig. 64 is a rear view of the needle plate and its support.

Fig. 65 is a detail view of the cutting mechanism.

Fig. 66 is a front view of the needle plate and cutting device, showing the needle in working position.

Fig. 67 is an end elevation of the needle plate and cutting mechanism.

Fig. 68 is a detail of a spring case.

Fig. 69 shows a pawl adapted to be mounted upon said case.

Fig. 70 is a top view of a tripping mechanism.

Fig. 71 is a side elevation of same.

Fig. 72 is a plan view in detail, of the automatic starting and stopping device.

Fig. 73 is a side elevation of same.

Fig. 74 is a detail view of a support for the roller 473.

Fig. 75 is a plan view of a bracket for closing the clamps which hold the goods to be sewed.

Fig. 76 is a side view of same, partly in section.

Fig. 77 shows a series of inclined planes mounted on the guide bars to engage and disengage the cam rollers.

Fig. 78 is a front elevation of a tripping device designed to open the clamps for unloading.

Fig. 79 is a plan view of same.

Fig. 80 is a side view of same.

Fig. 81 is a detail of a portion of Fig. 52.

Fig. 82 is a side elevation of the clamp.

Fig. 83 is a skeleton plan view of the general arrangement of the principal parts, showing their relative positions, with the sewing machine at the right hand limit of its movement, in the guide base, shown in Fig. 1.

Fig. 84 is a side elevation of Fig. 72.

Fig. 85 is a general side elevation of the complete machine.

Fig. 86 is a general plan view of the same, showing portions broken away.

Referring to the drawings in detail 1 and 1$^a$ designate the converse members of a guide base for the sewing machine proper, having T-grooves 2—2$^a$ formed longitudinally therein, which grooves emerge into circular recesses 25 and 25$^a$ at their opposite ends from which the grooves 2 and 2$^a$ each continues rearwardly from its respective recess and in this instance at right angles to the main portion, though the angle at which these grooves are disposed with reference to each other, may be varied to suit the article sewn, as seen in Fig. 5.

To the front and parallel with grooves 2—2$^a$ is formed the broad, plain groove 3—3$^a$ which also opens into the recesses 25 and 25$^a$, and being slightly shallower, leaves the shoulders 25$^b$ and 25$^c$.

At the lower portion of the base members 1 and 1$^a$, along both ends and the front side thereof, is formed a recess 4 and 4$^a$, in which are secured the racks 15 and 15$^a$, each having at its inner end a pin 17 and 17$^a$ respectively upon which are pivoted the toothed links 18 and 19 respectively each of which is held in alinement by a spring 20, which permits them to swing outwardly as shown in dotted lines 18$^a$, Fig. 1.

22 and 22$^a$ are segments of a ring fitted in each recess 25 and 25$^a$ respectively and held in place by screws 5, the lateral edges of the segments conforming to the rearwardly extending portions of the T-grooves 2 and 2$^a$ and the front edges conforming to the other portion thereof.

6 and 6ª are disks journaled into recesses 6ᵇ and 6ᶜ formed centrally in said recesses 25 and 25ª respectively, each disk having formed integrally thereon, a shank 28 and 28ª respectively, extending through apertures 29 and 29ª respectively, in the bases 1 and 1ª. Each disk is fitted within its corresponding segment 22 and 22ª, and each has a groove 24 and 24ª respectively which registers with said T-grooves, though a space equal to the width of segments 22 and 22ª intervenes between each disk and the rearward portion of the groove.

13 are segment plates fitted in the outer portions of recesses 25 and 25ª, each held in place by screws 12, and each having the flanged ends 14.

29ᵇ is a cast iron plate of irregular form, as seen in Figs. 6 and 7, and upon its under side is fixed a T-bar 30, adapted to slide in the correspondingly formed groove 2—2ª. The bar 30 is equal in length to the diameters of recesses 25 and 25ª and its ends conform to their peripheries, so that it can revolve in the disks 6 and 6ª with the plate 29ᵇ and superstructure.

31 is a base plate secured upon the upper face of the irregular plate 29ᵇ, and fixed to one side of the center of oscillation thereof. 32 is an elevated base, or facing for supporting part of the superstructure. 33 and 39 designate an irregular recess formed in the plate 29ᵇ, within which are chambered the gears 132 and 133, which operate a rotary sewing machine hook, or bobbin. See Fig. 13.

An aperture 34 is formed in the plate 31 (Fig. 6), about which rises the boss 35, forming a journal for the lower end of shaft 125 carrying gear 133.

Adjacent the aperture 34, is formed another boss 37 which is provided with an opening 36 extending to the plate 31 forming a step bearing for the foot of shaft 122. See Fig 13. Opening 38 is made to receive the stud 65. 40 is an aperture in the plate 31 to form a journal for the shaft carrying the hook 130. 41 is an aperture in the plate 31 to receive the lower end of stud 79 (Figs. 6 and 10). 44 is a boss formed on the upper face of the plate 31 to receive the sleeve stud 67, see Fig. 10, carrying the shaft 48, which passes through the aperture 43 extending through the boss 45 on the lower side of plate 31. The opening in boss 44 is large enough to receive said sleeve 67, upon the shoulder 44ª, of the plate 31 about said aperture 43, the opening in said sleeve being coincident with aperture 43. The sleeve is held in the boss by the screw 83.

Upon the shaft 48 (Fig. 10), above said sleeve 67 is integrally formed the disk 46, having upper and lower radial teeth 47 and 47ª respectively, terminating at the circumference. Below the disk 46 is secured about the shaft 48 another disk 68, having upper teeth 68ª conforming to and meshing with teeth 47ª. This disk is secured upon the upper face of gear wheel 70 by means of screws 72, and it in turn is fixed upon the sleeve 71 which is formed integrally above gear wheel 71ª resting upon the boss 44. The sleeve 71 is mounted exteriorly of the sleeve 67, and wheel 70 is fixed upon the sleeve by means of pin 73.

Some distance above the disk 46, about the shaft 48 is mounted a gear wheel 66, having on its lower face radial teeth 66ª adapted to mesh with teeth 47. About the shaft 48, within said gear wheel, is secured a hollow stud 142, which rises through a plate 120, to which it is fixed by means of nut 63. A short distance above this stud on the shaft 48 is formed a shoulder 62 leaving the remainder of the shaft reduced to a smaller diameter as at 48ª. Upon this shoulder rests a sleeve 61 extending well toward the top of the shaft. A short distance above the bottom of this sleeve is formed an exterior shoulder 61ª upon which rests a washer 59 carrying a spring 60, upon the upper end of which is another washer 59 over all of which is placed the spring casing 58, secured in place by the cap 57, within which latter is secured a terminal cap 55, the lower end thereof bearing on the upper washer 59 permitting the spring casing to move up and down thereon. The upper end of the shaft is further reduced at 52 to form a shoulder to support the washer 54, journaled against the cap 55, and which is held thereon by the nut 53.

Integrally upon the lower end of spring case 58 is formed the arm 75 carrying the shaft 76, upon the lower portion of which is a sleeve 79 passing through apertures in the plates 31 and 120 and having upper and lower shoulders coincident with the upper and lower faces of said plates respectively, thus forming a spacer for the plates, upon the exterior faces of which are secured the nuts 77 and 81 respectively. The opposite sides of the plates are spaced by the post 65. Loosely journaled on sleeve 79, between said plates is a sleeve 79ª having a spur gear 78 meshing with gear 66, and toward the lower end is a spur gear 80, held thereon by means of a screw 82, and which meshes with spur gear 71ª, to which power is applied from gear 69 or 60ᵇ through the gear 70, as seen in Figs. 21 and 22.

Upon the lower end of shaft 76 is formed at right angles an arm 51 having a rearwardly extending terminal 50 adapted to engage with the diamond shaped projections 146 on the outer edge of the machine base 1 and 1ᵃ at points approximately opposite the respective transverse portions of the grooves 2 and 2ᵃ; and others opposite the longitudinal portion thereof.

84 is a spur gear fixed upon the lower end of the shaft 48, by means of pin 85.

86 is a casing inclosing a take-up spring 87 (Figs. 13 and 15) held therein by the cap 89, and supported upon the base 88 by the screw 90, the whole being supported upon the lower end of the needle-bar guide 161, and receiving the thread through the eye 91 of the spring.

92 is a drum cam (Figs. 13 and 14) fixed upon the upper end of shaft 125, journaled in the upper plate 120ᵃ, which is superposed upon plate 120, at one end and upon pedestal 126, at the other, standing upon the facing 32 of the plate 31, and journaled at its lower end in aperture 34 of plate 31. 120ᵇ is a boss on the plate 120ᵃ for supporting the cam.

93 is a cap for binding the pitman 95 upon the crank 94. The pitman is connected at its outer end to the bearing 102, which is secured by means of cap 105 to the arm 104 formed integrally upon the sleeve 103, which together with arm 96, mounted upon the journal 107 which is held thereon by the screw 108, the journal being fixed in the ear 101 rising from plate 120ᵃ, and it is held therein by the nut 100.

109 is a disk mounted centrally at the base of the upper portion 182 of the shaft 125, upon which a friction pulley for driving the machine, is mounted, and which will be described later.

In the drum cam is a peripheral groove 110 adapted to receive the roller 111 mounted upon the thread take-up 115, which is pivoted at 113 upon the stud 112 rising from the plate 120ᵃ.

Rising from the plate 120ᵃ, above the pedestal 126, is an arm 117 carrying a boss or sleeve 116 within which is held the needle-bar guide 161, having at an intermediate point an exterior flange forming a shoulder 119 upon which the said sleeve rests, and against which it is held by the nut 114, engaged upon threads 163 and which bears also upon the plate 216ᵃ. The needle-bar guide is provided with a longitudinal bore 162 (Fig. 24) to receive the needle bar 243.

Immediately beneath the plate 120ᵃ is mounted the spur gear 121 upon the shaft 122, which carries in its lower portion gear 123 contiguous to the stop bearing 37. In like manner the gear 124 is fixed to the shaft 125 and meshes with said gear 121, for transmitting power thereto.

134 is an ear projecting at right angles from the lower end of the needle bar, and has at its intermediate portion an aperture to receive the needle 129, which is held therein by the set screw 244. The terminus 245 (Fig. 42) of the ear is provided with an aperture 128ᵃ to receive the pin 128 to which the link 127, which is mounted upon pin 11 in the extremity of arm 96, is pivotally mounted.

Within the facing 32 and through the plate 31 is journaled the shaft 131 carrying the spur gear 132, below said plate, and upon said shaft 131 is mounted the sewing machine hook 130. Upon the lower end of shaft 131 is journaled a sleeve 131ᵃ, which has formed on its upper end a cup 131ᵇ embracing the gear 132 and rising to the plate 31 to which it is fixed, forming a lower journal for the shaft. The cup is open at one side to expose the teeth of the gear for engagement with gear 133, on the shaft 125.

135, as seen in Figs. 16 and 17, is a stop wheel mounted upon the shaft 141 journaled in the pedestal bearing 137 secured upon base plate 120. This wheel has three points disposed at equal distances apart, which are rounded at one side and radial at the other which are adapted to revolve beneath the depending right angular arm 56, which is formed upon the upper end of the sleeve 55, so as to sustain the shaft 48 carrying the movable clutch 46, against the tension of spring 60, so that at the proper instant, upon the wheel being out of contact with arm 56, the spring will instantly drive said clutch to engagement with the lower member, as seen in Fig. 9.

Upon the outer end of shaft 141 is fixed a wheel 145, having the radial arms 139 with which the operative mechanism engages to move the wheel 135. In the hub of wheel 145 is formed a series of notches 138 to receive the tip of spring 136 which is secured upon the pedestal 137 by means of screw 144, to hold the wheel 145 from retrograde movement.

Upon the lower end of sleeve 61 is integrally formed an arm 62ᵇ which extends to the pedestal 137 and engages in the vertical slot 144ᵃ therein to hold the sleeve from rotary movement.

Figs. 21 and 22 show mechanism for changing the direction of travel and which receives power from spur gear 123 mounted on shaft 122, as seen in Fig 13; in Fig. 21 the power is applied to the gear 69ᵇ mounted on shaft 69ᵃ and meshing with gear 70, which gear is mounted on the upper end 71 of the hub 44, about which the plates 157 and 158 are mounted. A collar 158ᵃ is inset in the upper face of plate 158, and held by screws 158ᵇ, which pass through the oblong slots 158ᶜ and engage in the base plate 31, thereby permitting a slight oscillation of the plate 158, which carries the studs 69ᵃ on which are mounted the spur gears 69 and 69ᵇ, also the stud 147 carrying the gear 148. By means of this oscillation the plate 158, when shifted by contact of the operative mechanism with the point 159, disengages the gear 69ᵃ from the gear 123, and brings into engagement with the latter, gear 148, as seen in Fig. 22. This operation will reverse the movement of gear 70, which carries the feed mechanism.

When power is applied upon the point 160 in Fig. 22 it shifts the plate 157, which lies upon the collar 158ᵃ, throwing the tongue 150ᵇ against the shoulder 150ᵃ of the bolt 153 which is held in brackets 154 and compressed into forward position by the spring 155, so that the tip 156 will extend above the said plate 157, thereby disengaging the shoulder from the notch 150 of said plate. The stress will at this point be applied also upon the plate 158 at the point 159 carrying it with the gear wheels 69ᵃ and 69ᵇ back to the position shown in Fig. 21. The brackets 154 are fixed in the plate 151 which is held upon the base plate 31 by screws 152.

In Figs. 27 and 28 is shown the outside member 109 of a cone friction clutch mounted on the shaft 182, as shown in Figs. 13 and 31.

Upon the needle bar guide, above the support 116, is mounted at 216ᵃ the curved bar 216, which is supported at the opposite end upon a suitable bracket. See Fig. 28. In the end of bar 216 is formed a suitable aperture to receive the journal 206, which lies flush with the plate and has formed integrally therewith the casing 205, which is rectangular in its front portion to receive the rectangular portion of the spring bar 196, see Fig. 32, the side opposite the clutch being broken away to permit movement of ear 196ᵃ, as the bar reciprocates. The rear portion 209 of the bar carries the spring 206ᵇ which bears against the shoulder 203 to hold the bar in forward position in the tubular portion 207 of the casing, the bar being retained in position by the nut 208 upon the terminal 209.

Extending downwardly from journal 206 is a hollow stud upon which is secured a washer having a peripheral groove leaving upper and lower shoulders 208ᵃ and 209ᵃ between which is secured the spring 207ᵃ fixed upon the pin 188 in the bar 216, to hold the forward end of the casing 205 normally against the periphery of the clutch 109. The washer is held rigid by the nut 210 upon the stud 211. Extending vertically through the longitudinal slot 200 is the bar 201 and through said journal 206, is a bolt 213, supported on the bar 185, and held by the lock nut 215. The spring 214 holds the bolt and mechanism connected therewith in downward position.

Upon the forward end of the bar 196, on the stud 199ᵃ is pivoted a dog 192 having an upwardly extending sleeve 212, upon which is secured a spring 193, the lower end 195 of which is fixed in the upper facing of the dog, and the upper end 193ᵃ is fixed in the washer 194 which is rigidly held on the upper end of the stud 199ᵃ by the screw 199, tending to hold the dog in the position shown in Fig. 27, with the shoulder 191 against the periphery of the clutch, to engage the catch 190.

By reciprocating the slide bar 233 in keeper 230, shown most clearly in Figs. 36 and 37, the wide V-shaped notch 240 on its inner face engages the correspondingly formed projection or wedge 240ᵃ depending from the lower arm of the U-shaped riser 229, (see Fig. 31) the mechanism supported on said arm 185, which is fixed upon the shaft 183 resting on the upper arm 222 of the riser, to which it is secured by means of nut 223, is moved downwardly releasing spring 214, and allowing the tip 201 of the bolt 213 to be withdrawn, so as to release the dog 192. The force of catch 190 against the shoulder 191 will swing the rear end 202 of the dog to the position shown in Fig. 28, against the stop 198 on the upper face of the ear 196ᵃ of the bar 196, and the pressure against the dog swings the casing 205 on the pivot 206 against the stress of spring 207ᵃ, until the catch slides off the dog, permitting the latter to return to the position seen in Fig. 27 where the lug 197 will engage stop 198. The sleeve, however, remains in the position shown in Fig. 28 by reason of a lug 237 formed on the inner side of washer 209ᵃ which at that point engages the flexible tip 189, hinged at 187 and held in alinement by the spring 187ᵃ, upon the arm 186, which by means of aperture 186ᵃ is mounted upon shaft 183. While the spur 202 was engaged upon the tip 201 the stress of the clutch will shove the bar 196 rearwardly in the opening 203 of the casing, against the spring 206ᵇ, thereby absorbing the shock resulting from the impact, and stopping the sewing mechanism at the desired point each time.

In the upper face of the member 109 of the clutch is formed a cone shaped recess 109ᵇ, in the lateral portion of which is placed a friction element 109ᵃ. Within this recess is fitted the upper member 179ᵃ of the clutch, which has formed on its upper side the pulley 179, driven by the belt 177. Arm 176, is mounted upon the upwardly projecting hub 180 of said pulley, the opposite end being secured upon the screw threaded tip 97 of the shaft 161.

On the upper end of shaft 183 is fitted a sleeve 221, held in place by nut 220, carrying the arm 184 which is forked at its opposite end to embrace the neck 219 formed at the upper end of the hub 180 and held in place by the pin 181. Against the upper end of the hub, rests the spring 218 bearing at its upper end against the washer 217 held upon the shaft 182 by the nut 178.

Superposed upon the arm 176 is a bracket 166 secured by nut 165 upon the tip 97 of the shaft 161. See Figs. 27 and 24. At one extremity of the bracket is formed an aperture 167 to receive the thread and in the adjacent depending ear 168 is a further aperture 169 for the same purpose, from which the thread passes to the tension disk 170 mounted on the stud 171, in the depending arm 174, in which it is held by nut 175. The necessary tension is given to the disk by means of spring 173 which is held in adjustment by the nut 172. It will be understood that the thread will be installed in the machine in the usual manner, in sewing machines.

To the pedestal 126 is pivoted a U-shaped lever by means of screw 247, the shorter arm 226 of which carries upon its terminus a cam lug 224 which bears upon the collar 225 having at one side the cam surface 246. The other arm 249 of the lever extends through the opening in the riser, and carries at its terminus the presser foot 227, through which the needle 129 operates.

Depending from the base of the U-shaped lever is an arm 228 having a slot in its lower end through which a spur 235 projects. Upon this spur is placed a spring 236 bearing against said arm, so as to rock the lever on its point 247 and thereby hold the presser foot normally in down position.

273 is the base of a cutter frame having the upright member 253, to the upper end of which, at the rear side is fixed the needle plate.

Upon the support 274 are positioned the pedestals 286, each supporting upon its upper end a horizontal sleeve 287 at right angles to the median line of the machine. Within each of these sleeves is another sleeve 307 having a flange 285 at the inner end of which is mounted in the manner shown in Fig. 48, the cam drum 298 to be later described.

Within the inner end of sleeve 307 is fitted a sleeve 278 secured upon the shaft 277, adjustably held by the feather 301, and provided with the oil opening 300. Toward one end of sleeve 278 is formed a shoulder 304 bearing against an internal rib 304$^a$ within sleeve 307, and upon the terminus of sleeve 278 is secured a nut 306 bearing upon the shoulder 305, to form a bearing upon the outer facing of rib 304$^a$. The shaft 302 passes loosely through these sleeves and has secured near its outer end, by means of screw threads 312, a cap 308 which is secured to the extremity of sleeve 307, by means of ordinary screws. Beyond cap 308 is formed an integral collar 310, over which is journaled the cap 311, by means of the shouldered aperture 309. This cap is firmly secured to the outer sleeve 287, and against its outer face is securely fixed the sprocket 288 upon the terminus 290 of the shaft 302. Upon the two sprockets, as seen in Fig. 45, is mounted a sprocket chain 292, so that as one of the sprockets 288 is rotated by the crank 288$^a$ the inner sleeve 307 together with sleeve 278 will shift longitudinally upon the feather 301. It will be understood that each shaft 302 extends through the machine and has mounted thereon structure similar to that just above described, except that the screw threads corresponding to threads 312 will be cut in the opposite direction, so that the structure at the two ends will move simultaneously and in opposite directions, to adjust the machine to the size of the article sewed, which is clearly shown in Fig. 48.

As shown in Figs. 45 and 46 the frame 281, extending between the two pedestals constitutes the main frame work and carries at its intermediate point the sewing mechanism. The upper and lower faces of this frame extend at equal distances above and below their points of support and at each corner thereof is formed a recess 281$^a$. Upon each sleeve 278 is integrally formed an arm 314, which corresponds in length to one half of the vertical dimension of said frame 281, each arm carrying a swinging transfer 289 and 289$^a$ respectively at each corner of the outer end of which is formed a projection 281$^b$ adapted to engage in its corresponding notch 281$^a$, as the arm swings with the sleeve 278 on its pivoted support from the upper to the lower face of the frame, or viceversa. As seen in Fig. 47 a slide way 321 is formed on the inner face of the arm, at its outer end, into which the tip 315 of the bar 318, enters. This bar is mounted in a bracket 316 on the inner face of the arm and is held normally in the slide way by the spring 317, and as the bar 299 moves longitudinally, the portions at the sides of the notch 426 engage pin 320 depressing bar 318, as seen in Fig. 57. Beneath the bar, in a groove 425, as seen in Fig. 61 is a thin V bar 299, having in its lower edge a V-shaped notch 426, which, when it is central over the pin 320 allows the tip 315 of the bar 318 to enter the slide-way, and as the bar 299 is shifted either way, it will cause the latch bar to be withdrawn. If desired the bar 299 may be mounted on screws 424 in the slots 423.

In the inner face, near the upper and lower edges of the side member of the frame 281 are formed slide ways 284 with which the slide ways 321 will register when the arms 314 are swung to the corresponding positions. At the median point of the frame, in the upper face, is formed a deep transverse recess to receive the guide base 1, (see Fig. 1) which supports the sewing mechanism. The groove 8 in said guide base conforms to and registers with the groove 284 of the frame. The guide base is firmly secured upon the bottom 282 in said recess.

As seen in Figs. 48 and 46, the bar 325 which is secured at its ends to the pedestals 286, at each end of the machine, rises at its intermediate point, curving inwardly so as to clear gear 276, (Figs. 46 and 61) and returning again to a point above the pedestal 286, as at 325$^a$, in which portion is formed a groove to receive the teeth of spur gear 276 to form a lateral support therefor. (See Fig. 48.) From this point the casting rises to form the base 296 to support the guide bars 280. On the inner side of the inwardly curved portion of each bar 325 is cast an inwardly projecting sleeve 324, which at its lower side embraces the shaft 420, forming the bearing therefor, the upper portion rising, as indicated in Fig. 48, to embrace in a channel therein the slide rack 275 meshing with gear 276, on the upper face of which rack is mounted a vertical roller 294 upon a suitable pin.

Upon these opposing sleeves is fitted the drum 298, shown in detail in Figs. 54 and 55, and having the inner sleeve 297 at one end and 297$^a$ at the other, intermediate of which is secured to the drum on integrally formed supports the shaft 420, bearing in the boxing 420$^a$ of sleeve 324. The sleeve 297 projects from the drum a short distance and has secured thereon the gear 295, by means of which the drum is driven.

In the left hand end of the drum, as seen in Fig. 46, are formed grooves 419$^a$ and 419$^b$, and to the right therefrom are formed grooves 419$^c$, 419$^d$ and 419$^e$, to actuate the carriages which support clamps carrying the article to be sewed, and which will be described later in detail.

About the inner face of sleeve 297 is formed an irregular groove 422, and similarly within sleeve 297$^a$ is formed an irregular groove 421 for actuating the swinging arms 314, through the rollers 294 traveling in their respective grooves, and which as above stated are fixed upon the sliding racks 275, which engage the gears 276 and 276$^a$ mounted on shaft 277, thereby actuating the sleeve 278 through the feather 301.

280 are upper and lower guide bars, arranged in pairs and between which bear the guide rollers 413 mounted on the journal 417 of the post 328 which is secured in the sleeve 347, and which is surrounded by the spring 427 in the opening 428 and is sustained in place by the nut 393. The sleeve 347 in each case is made integrally upon the cross bar 348, which cross bars are connected by the longitudinal bar 349, as seen in Fig. 49. Upon the journal 417 beneath the roller 413 in each case is another roller 418, sustained thereon by the flange 430, and adapted to bear in the cam grooves on the drum 298. See Fig. 60.

On the journal 417 of the post 328 rests the sleeve 431 which is held in place by the nut 429. On the exterior of this sleeve is formed a spur 412 which extends through a suitable slot in the lower portion of the shell 347, to contact with the riser 414 (see Fig. 52) for disengaging rollers 418. The cross bars 348 are mounted to slide in bearings 346 at their respective ends of the slide plates 343, on the outer edge of each of which is a depending flange 345 adapted to move in the slide way 284 of the frame 281. 409 are posts rising from the front ends of the respective slide plates 343, and upon them is mounted the clamp, the lower member 340 of which is shown in Fig. 49. This clamp holds the cuff or other article while being sewed. It is supported upon an arm 354 made integrally with an inner sleeve 334 upon each of the posts 409 (see Fig. 52). This lower clamp is composed of two end-pieces united by the stiffening bars 338, which are supported by cross bars 354, and held in position therein by pins 353.

By operating the sprocket wheels 288, Figs. 45 and 46 also 47 the frame 281 will be adjusted laterally on the shafts 277 working in the screw threaded nut 308 shifting the two members, (one of which only is shown in Fig. 45) either to or from each other. The guide-base 1, 1$^a$ which is mounted on these two members of the frame, also is in pairs and shifts with them. The two members 340 of the clamp, in like manner, are made to shift to and from each other; and to provide them with a substantially continuous front edge, one half of the jaw is depressed near its front edge at the inner end, at 352, the depressed portion and the front edge at that point being extended slightly beyond the median point between the two members. A corresponding portion on the front edge of the other member is broken away at 344 to form a space to receive the spur 351 when the members are moved together, and a tongue 342 corresponding in thickness and position to the depression 352 also is formed on the other member, and is extended sufficiently that when the members are in extended position they will overlap, thereby making the front edge continuous in all degrees of adjustment to meet the varying sizes of cuffs. The upper face of the clamp 340 is slightly raised and serrated contiguous to its edge, as indicated at 339 and 350 so as to more securely hold the article being sewed.

341 is a steel spring secured upon the bottom of each of the members 340 of the clamp, the free end of which passes upon the upper face of the clamp toward the front edge, at which point it rises from the clamp to meet a correspondingly formed spring 368 in the upper jaw 365 of the clamp.

Upon each post 409 is mounted a sleeve 334 carrying the arm 354, as above stated, the lower portion 410 of which is broken away to clear the projecting portion 333 of the plate 343 upon which the post is mounted. Upon each sleeve 334 in turn is journaled another sleeve 359, having a forwardly projecting lug 363 carrying a plate 366 upon the pair of which is secured the upper jaw 365 of the clamp. A rib 364 rises from each plate 363 in the forward end of which on the pivot 395 is mounted an upright link 392, which is similarly mounted at its upper end upon the pin 391 in the forward end of the walking beam 394 bearing on the pivot 390 in the upper end 335 of the post 409 by means of the mortise 388. The rear end of each beam is similarly mounted on a pin 387 in an aperture 373 in the upper end of the exterior member of the spring link 381, which telescopes upon the inner member 382, which has an aperture 383 pivoting upon pin 386 formed on the rearward extension 397 from the lower end of sleeve 334. Above the end portion 385 is formed a shoulder 384 supporting a spring 380, which embraces the member 381 and bears against the shoulder 379 formed thereon. In the upper end 377, of member 382 is secured a pin 376, which projects from the slot 378 of the outer member, thereby limiting the expansion of the spring 380. Upon the arm 397 is seated a bolt 327, which bears in its upper end in the aperture 356 in the lug 357 extending from the upper end of sleeve 359, Fig. 51. Upon this bolt between the two seats is fixed a spring 327ª, which tends to open the jaws 340 and 365 when the stress thereon is removed.

In the lower portion of the arm 397 is formed a pivot pin 399 on the ear 406, to bear in aperture 398 of the link 401. The lower end of the link is pivoted on the pin 403, supported on lugs 402 formed on the upper side of the shaft 331, which is journaled in brackets 330, seen most clearly in Fig. 49, and held in place by pins and screws, 404 and 405.

Depending from shaft 331 is a lever 326, which in the vertical position shown in Fig. 52 locks the jaws of the clamp in closed position; and when swung rearwardly, as indicated at 326ª releases the jaws, so that they may be separated by the spring 327ª.

The upper member 365, of the clamps is slidably mounted upon the shaft 358 bearing in the lugs 363 and extending at each end through brackets 360, and sustained by pins 361. This member 365 is composed of two end pieces conforming to the end-pieces of the lower member, which are secured upon the plates 366, and are united at the front edges by the bar 372, which is adjustably secured to the bars 367 by means of studs 371 in the slots 369 which are provided with facings 370. The outer portions are each provided with diagonal sustaining bars 362. By forming this diagonal member of thin flexible material the clamp member is made flexible so as to conform to slight irregularities and the slotted bar permits of a lateral adjustment in conformity to the lower member, which may become necessary to suit the varying sizes of articles to be sewed.

In Figs. 62 to 66 is shown a base 273 having at each side a standard 253 upon the upper ends and to the rear of which is fixed a needle plate 253ª, in which is formed in its median portion a longitudinal shoulder 456, adjacent which is formed a converging slot or needle opening which terminates at its center in the aperture 291. In the upper ends of the standards are journaled the hollow shafts 252ª and 252ᵇ, the latter being provided with a tongue 252ᵈ to engage the slot 252ᶜ in the former. A bolt 453 holds the members in position. On the outer portion of each shaft is formed an arm 251 and 252 respectively. Arm 251 has at its outer end a right angularly formed cutting jaw 251ª, and depending in the opposite direction from the rear end is arm 455, to which is pivoted upon the pin 454 the bar 255. At the outer end of arm 252 is a right angularly formed cutting jaw 252ᶜ, conforming to the jaw 251ª. Near the rear side of the needle plate at each end, is formed a stud 450, over which engage the arms 452, by means of slot 450ª, in the rear ends of the inner cutting members 269. Each of these cutting members has an uprising jaw 269ª, which forms the counterpart of its respective outer cutting member. At the angle of each inner cutting member is an outwardly extending pin 451 which engages the aperture 451ª formed in the corresponding angle of the outer cutting member, so that as the outer members are operated on their pivotal support by the link 255, the two jaws will rise above the level of the needle plate and close upon each other as a pair of shears, so as to clip the thread which will be between them at the moment it is to be cut.

In the operation of the clamp supporting carriage, the lug 267 fixed thereon, will contact with the roller 265 as shown in Fig. 39, mounted on the journal 266 at the end of arm 262, of a right angled lever, the other arm 264 of which being pivoted upon the pin 263. From the angle of said lever is formed an extension 261 supporting a shank 259, upon which is journaled the bar 255 held by the pin 260.

As the lug 267 bears upon the roller 265 the bar swings upon pivot 263 against the spring 258, which is secured at one end to the pin 257 and is shouldered into the lever at the other end, at 256.

This movement causes the bar 255 to operate the cutting members, as above described, and the instant the lug 267 passes the roller 265, the spring 258 restores the parts to their normal position.

At the tangent point or corner of the plate 1ª, of Fig. 1 is fixed by means of ears 457, see Fig. 70, a bracket having an extension 459 projecting in line with the transverse portion of the track in the guide-base 1 and 1ª; and another arm 471 extending at rightangles thereto in line with the transverse axis of said turn table. Each of these arms extends horizontally a distance sufficient to clear the traveling sewing mechanism, moving about the periphery of the plates 1 and 1ª. Here they curve abruptly upwardly as shown in Fig. 71, to form the upright portion 461.

Beneath the rear portion of each plate 1 and 1ª is secured mechanism for automatically starting and stopping the sewing mechanism, seen in Figs. 72, 73 and 74. A bracket 480 has at one side, in its upper face a tongue or rib 479 adapted to slide in the groove 2ᵇ formed in the lower face of the plate 1ª, see Fig. 73, by means of which it is sustained in position. (It will be understood that similar structure is provided for the plate 1). This bracket has formed on its lower side a stud 490 carrying upon its lower end a washer 502, held thereon by screw 501. A sleeve 491 resting on the washer carries at its upper end the arm 488 extending to the right, as viewed in Figs. 1 and 73; and from its extremity an ear 486 is made to depend to form a base for the spring 485. Another arm 478 extends to the rear from the upper end of sleeve 491, until it will clear the plate 1ª, where it rises, so that the projection 477 will stand above the plane of that plate. Extending inwardly from this arm, at right angles thereto is a branch 475 which abuts against the swinging plate 497 which carries at its opposite side at the upper end, in suitable ears, a roller 473, held therein by pins 474. This plate is hinged at its lower end, by means of pins 498, to the ears 500, formed on the frame 281.

About the sleeve 491 is mounted another sleeve 492, which also rests on the washer 502 and which carries at its upper end the arm 489 against the lower side of arm 488. An ear 487 depends from this arm at a point opposite the ear 486, between which the spring 485 is mounted. After clearing the plate 1ª the arm 489 rises vertically at 483 to engage with the trip mechanism where it contacts with the points 159 and 160, as seen in Figs. 21 and 22. When the carriage plate 343 (Fig. 49) moves forward to sewing position, the cam lug 472 contacts with the roller 473 forcing the arm 478 outwardly, thereby compressing the spring 485. It will thus be seen that when the gear 148 is swung into an engagement with gear 123, in the first motion, by contact point 484, if the teeth do not mesh, the force of the spring in the succeeding movement will cause them to seat at once, permitting the bar 153 to engage the notch 150 of plate 158, to retain the mechanism in position until the sewing mechanism reaches the limit of its travel, when it will be released by a similar reversing mechanism on the plate 1, at the opposite limit of travel.

To the inner side of the adjustable frame 281 (Figs. 74 and 76) is secured a bracket 495, by means of the base 496, having a face plate 494 which rises inwardly to the level of the inside lip 283. There is one of the face plates at each side, in position to contact with the corresponding projection 410 depending from the rear edge of each member 340 of the lower jaw of the clamp, thereby closing the clamp.

Fig. 77 shows a number of guide bars adapted primarily to maintain rollers 413 in longitudinal position. In Fig. 77 280ª represents top and side views of a bar also shown in Figs. 48 and 60 in which a cam lug 414 secured near its rear end is made to contact with the lug 412, thereby raising the cam rollers 413 and 418 to the positions shown in Fig. 52. The roller 418 travels in groove 419 of the roller cam 298. See Fig. 56. The motion of the roller is so timed that it will reach the lug 414 at the proper instant to raise the roller 418 from the groove at its end.

On the opposite side of roller 413 is fixed another guide bar 280ᵉ of which Fig. 77 shows a top and a side view; and upon it is secured at its front end a cam lug 505. This lug withdraws the roller 418ª suspending it above the cam, until the roller 418 reaches the point at which it was withdrawn. At this point the cam will have passed the cam lug 505 which allows the roller 418ª to return to engagement with the cam groove 419ᵉ.

The roller 418ª continues in cam 419ᵉ to its end which delivers the carriage to the grooves of the swinging transfers 289, the rear transfer being at the top position to receive the clamp carriage. The swinging transfer moves in timed relationship with the cam roller 418ª at the end of groove 419ᵉ, when the transfer delivers the clamp carriage to the groove 284 in the lower part of frame 281. Here roller 418 contacts with the cam lug 504 of the guide bar 280ᶜ, which withdraws the roller so that it will not engage in the groove 419ᶜ. The lug 504 is very short and carries the roller only until it clears the groove 419ᵉ, permitting it to engage the groove 419ᶜ. Toward the opposite end of bar 280ᶜ is another cam lug 503 which again disengages roller 418 from groove 419ᶜ at its extremity, and permits it to engage in the groove 419ᵇ.

Adjacent the bar 280ᶜ is a similar bar

280ˢ carrying on its lower face cam lug 507 which sustains roller 418ᵃ from engagement with the cam. As the lug 503 disengages the roller 418, lug 507 permits roller 418ᵃ to engage in cam groove 419ᵈ. When lugs 503 permit roller 418 to engage the cam, lug 506 again withdraws roller 418ᵃ from engagement with groove 419ᵈ permitting roller 418ᵃ to engage in groove 419ᵃ, which groove conducts the roller and carriage into the groove of the swinging transfer element 289 at the front end of the machine, ready to swing into loading position, at the upper side of the main frame, where it remains 10 to 20 degrees from the vertical for a period long enough to be loaded and to permit the article in the preceding clamp to be sewed.

Figs. 78 and 80 show a tripping mechanism consisting of the casing 517 fixed by means of screws, or otherwise, to the outer side at the rear end of guide bar 280ᵃ. See Fig. 60. This casing has a square longitudinal opening to receive the square bar 513, which is rounded at its forward portion 509, which extends beyond the casing, and has fixed thereon the spring 511 held in place by the nut 510 against said casing and adapted to hold the bar in forward position. An arm 508 rises from the rear end of the bar 513 and inclines toward the center of the machine to stand in line with and engage shoulder 521 on the link 519 pivoted on the pin 523 on bar 349. (Figs. 52 and 81). To the lower side of bar 513 is fixed a stud 515, which reciprocates in the open under side of the casing 517, and which is inclined so as to stand in a radius of the axis of rotation of the cam drum; and it has mounted thereon a roller 514 held by the pin 522 which bears against the rear edge of the cam drum, and as the latter rotates the spring 511 will force the said roller into the recess 516 and at the same time retract the bar 513, thus bringing the arm 508 into contact with said shoulder 521, and through the link 519 actuate the bar 520 pivoted by means of pins 524 and 525 to link 519 and the lever 326 respectively.

As seen in Fig. 52 the lever will be carried forward as shown at 326ᵃ swinging link 401 on its pivot and releasing the lower jaw supporting member 397, which will drop by gravity, or by force of spring 327ᵃ, and by means of walking beam 394, which rises to the position shown at 391ᵃ, the two jaws will be separated to the positions shown dotted at 396.

In each side of each clamp is fixed a pair of springs 341 (Figs. 49 and 82), the rear end of each member being recurved to engage upon the rear edge of its respective jaw and held by rivets 526, while the forward ends meet at a point intermediate of the jaws.

When the clamp is in loading position, one member of the article to be sewn 340ᵃ will be placed upon the lower jaw 340, and the other member 340ᵇ upon the upper members of the springs. As the jaws are forced together upon the cuff the spring members also will be forced together in the space 365, when the clamps open again in unloading position at Z the springs support the cuff intermediate the jaws in position to be grasped by the jaws 530 of the receiving device.

In the operation of the machine, power will be applied to the cam roller 298 through spur gear 295 which will rotate the drum as indicated by the arrow, (Fig. 46). The swinging transfer element 289, at the feed end of the machine, is periodically stopped in an inclined position, as seen in full lines, Fig. 61, long enough for an attendant to insert an article, such as a cuff, into the clamp jaws, as indicated at X. In this case the lower plies 340ᵃ are inserted beneath the springs 341 and the other plies 340ᵇ of the cuff will be inserted above those springs.

As motion is imparted to the cam drum 298, which is supported on shaft 420, which is journaled in the castings 324 and 324ᵃ supported on the bars 325, the roller 279 which operates in the groove 422 formed in the inner face of the bushing 297 fixed in the front end of said cam drum, will be at the point N, Fig. 58 and will cause a retraction of rack 275, rotating the gear 276 and causing the transfer element to seat in the recess at the upper edge of frame 281, bringing the grooves 284 and 289 into registration. As the transfer element is thus seated the projection 410, which, when the clamp is open, will be extended to the position shown at 410ᵃ, and will impinge upon face plate 494, shown in Figs. 48 and 75, which carries upwardly the lower jaw supporting member 397, carrying upwardly the lower jaw and rocking the walking beam 394 depressing the upper jaw to securely hold the goods in the clamp. With this movement the link 401 will swing to vertical position beneath the pin 399 on the lower jaw supporting member 397 locking the jaws together.

A short succeeding portion N of groove 422, Fig. 58, is formed at right angles to its axis of rotation and holds the transfer element stationary while the clamp carriage is moved therefrom. Then the roller 279 enters the inclined portion M of the said groove which drives outward the rack 275 swinging the transfer element to a corresponding position at the lower side of the frame, where it will receive the approaching clamp carriage in the lower groove of the frame 281.

Simultaneously with the foregoing movement the roller 279ᵃ engaged in groove 421 similarly formed in the bushing 297ᵃ fixed in the rear end of the cam drum, was reciprocating the rack 275 to drive the gear 276ᵃ and thereby swing the transfer element 289ᵃ to its lower position. This movement is timed to take place immediately after the clamp carriage has been received into the groove of the transfer element 289$^a$ which delivers it to the groove in the lower part of the frame.

When the loaded clamp carriage is discharged from its transfer element the roller 418, Fig. 52, engages the external groove 419 of the cam drum, which carries it forward to the sewing position Y, at which point the groove is formed at right angles to the axis of rotation holding the carriage stationary for the sewing operation. During this period cam roller 418$^a$ will be supported on the cam lug 505 on bar 280$^e$.

At the end of the sewing period roller 418 will engage the portion O of groove 419 causing the carriage to move forward. At this point the carriage will leave the cam lug 505 of bar 280$^e$ permitting the roller 418$^a$ to engage cam groove 419$^e$ at the point P. Here the carriage is moved forward and the roller contacts with the cam lug 414 on the bar 280$^a$, disengaging it from the portion O of groove 419, the roller 418$^a$ moves to the portion Q of the groove 419$^e$ which permits it to remain stationary for a brief period.

At this point the roller 514 of the tripping mechanism shown in Fig. 78, will enter recess 516 in the rim of the cam drum permitting the spring 511 to withdraw the arm 508 so as to strike upon the shoulder 521 projecting from the side of the link 519 depending from the carriage frame, which throws the link 401 off center, and allows the spring 327$^a$ to open the clamps, carrying the trip mechanism to the position shown dotted at 326$^a$. The clamps are carried to open position to 396 and the walking beam will rise to 391$^a$.

At this point the jaws 530 of a receiving machine will engage the selvage edge 270 of the cuff, or other article, and the cam roller 418$^a$ will then enter the portion R of groove 419$^e$ causing the carriage to recede from clamps 530 leaving the article there. After a short distance the groove 419$^e$ inclines to a course parallel with the end of the drum and then inclines abruptly to the rear end where it returns the carriage to the swinging transfer element 289$^a$, which is caused to rise to that point by the cam roller 279$^a$ resting on roller 294$^a$ mounted on a pin fixed in the rack 275 and operating in the portion S of the internal groove 421 of the bushing 297$^a$. The portion T of the groove, which is parallel with the end of the drum, holds the transfer element stationary during the unloading period and the portion U causes it to return to the lower side of the frame where it is held for a brief period by the parallel portion V, the carriage being swung at the same time to the track at the lower side of the drum, in a manner similar to that described in going from the loading position; and it is caused to advance toward the front end by the roller 418 entering the groove 419$^c$ into which it enters after the projection 412 leaves the cam lug 504 on the bar 280$^c$. When roller 418 approaches the end of groove 419$^c$ the cam lug 507 on bar 280$^g$ releases the projection 412 which has heretofore been sustained thereby, permitting cam roller 418$^a$ to engage in cam groove 419$^d$. The projection 412 engages with cam lug 503 on bar 280$^e$ which raises it, lifting the roller 418 from the groove 419$^c$, at which time the roller 418$^a$ is approaching the end of groove 419$^d$, when cam lug 503 releases projection 412 permitting roller 418 to engage groove 419$^b$. At this point projection 412$^a$ contacts with cam lug 506 on bar 280$^g$ withdrawing roller 418$^a$ from the groove 419$^d$. As the roller 418 approaches the end of groove 419$^b$, the projection 412$^a$ will be disengaged from cam lug 506 permitting roller 418$^a$ to engage the cam groove 419$^a$ which delivers the carriage to the transfer element 289 at the front end.

Upon the inner face of each arm 314 supporting the swinging transfer element is a latch bar 318 held in a bracket 316 (Figs. 47 and 47$^a$), and pressed outwardly by spring 317, said latch bar having a pin 320 projecting therefrom into a guide slot 319, the point 315 of said latch bar 318 being positioned to engage the opening 315$^a$ of the carriage. Beneath the latch bar in a groove 425 is slide bar 299 held in place by screws 424 in the slots 423, in the lower edge of which is a notch 426 adapted to stand normally over the pin 320, so that when the link is out of contact with the frame at either limit of its movement, the latch will engage the carriage and retain it in place. And when it is seated at the end of its movement in either direction the bar 299 which projects beyond the transfer element 289 will strike the frame and be caused to move in its slot and withdraw the latch from the carriage to permit the movement in the track.

The guide base shown in Fig. 1 will be firmly secured in its seat 282 in the main frame shown in Figs. 45, 46, and 61, with the grooves 7 and 7$^a$ in registration with grooves 284 in the respective sides of the frame—see skeleton Fig. 83 for the general arrangement. The sewing machine proper shown in Fig. 13 will be installed on the guide base with the T-bar 30 in the groove 2$^a$ and the gear 84 shown in Figs. 9 and 10 meshing with gear rack 15$^a$.

Upon the application of power through pulley 179 the sewing machine will be driven forward in the groove 2$^a$ by the operation of gear 84 in said rack. The guide bar will be carried across the recess 25$^a$ entering the groove 24$^a$ of the turn table 6$^a$ and striking the opposite wall 25$^c$ of the recess. At this point the gear will have reached the rounded portion of the rack which swings the turntable with the machine on the pivot 29ª until the guide bar strikes the segment 22ª where it will enter the longitudinal portion of the groove 2ª. Here the gear will have passed the rounded portion of the rack and its further movement will carry the machine forward in the groove, entering the groove 2 of the member 1, where it will be turned again on the turntable 6 to finish its course in the transverse portion of the groove 2, when the slide bar 233 on the upper face of base 29ᵇ will strike the projection 477 of the arm 499 which rises in line therewith from the frame work below. This will arrest the bar and as the machine advances the V-shaped notch 240 therein which receives the correspondingly formed projection 240ª, as seen in Fig. 37, will raise the U-shaped bar 229 and thereby the shaft 183, at the top of which is the arm 184 which also is carried upwardly against the spring 218, lifting the clutch out of engagement. At the same time the arm 185 raises the pin 213, the terminus 201 of which engages the point 202 of the dog 192, holding it against the spur 190, as seen in Fig. 27, thereby stopping the machine. It will be understood that this same upward movement of the shaft 183 carries upward also the arm 186 which raises the latch 189, Fig. 33, disengaging the lug 237 on the collar 209ª projecting from the lower face of the casing 205. This allows the casing and the dog 197 to swing under the force of spring 207ª from inoperative position to the position shown in Fig. 27. This also is timed to take place with the needle in raised position.

It will be understood that the cam drum 298 has continued in operation and that the clamp carriage will have been loaded and moved from loading position at X to the sewing position at Y.

Just prior to reaching the position Y the clamp carriage 343 will engage roller 473 forcing the arm 475 forward, so that the slide bar 233 will be disengaged from the projection 477, when the force of the spring will drive the parts back to their down position, forcing the bar 233 through the opening or notch 499 in the arm 475. This engages the clutch to set the sewing machine in motion again, and also withdraws the stud 213 disengaging the dog 192 so that it will swing as seen in Fig. 28 permitting the clutch to operate again and the lug 237 to again engage the pawl 187.

With the moving of arm 475 in the first operation of the sewing machine, as above described, the arm 488 swings against the spring 485 causing the arm 489 also to swing carrying the projection 484 into contact with projection 160 of the plate 157 rotating it to disengage the latch 150ª. Then it engages the projection 159 of the plate 158 rotating it disengaging gear 148 from the drive gear 123 and placing gear 69ᵇ in engagement therewith and thereby reversing the movement of gear 84 carrying the sewing machine back over its track to the starting point, sewing the article held in the clamp. It will be understood that in the return movement of the sewing machine the projection 184 will contact with the opposite side of projections 160 and 159 rotating the plate in the opposite direction which will return gear 148 to the drive gear 123 and disengage gear 69ᵇ therefrom, thereby reversing the movement again.

At each corner of the guide base and at each side thereof where the curvature begins, is fixed the cam lug 146. See also views in Figs. 1 and 8ª and side views in Figs. 9, 10 and 17. In the advance of the sewing machine in the movement first described the terminus 50 of the arm 76 will engage beneath the first lug on the under side, as seen in Fig. 9, carrying the spring case 58 downward against the spring 60, the stress of which is supported on one of the three points of stop wheel 135, by means of a depending arm 56.

At the same time the trip wheel 139 on the outer end of shaft 141 contacts with the dog 465 on the arm 461, seen in Figs. 71 and 83, turning it one-sixth of a revolution disengaging the arm 56, thus permitting the spring 60 to depress shaft 48 and disengage the clutch 46 from position seen in Fig. 10, carrying it to the position seen in Fig. 9, which will increase the speed of shaft 48 sufficiently to maintain the same rate of feed per needle stroke as in the straight portion of the movement under the low gear.

Upon the approximate completion of the curve the terminal 50 will engage with another cam lug 146 having its cam surface oppositely disposed so as to raise the arm 76 and the parts connected therewith, and at its completion of the curve a point of the trip wheel 139 will engage the pawl 465, causing the wheel to again turn one-sixth of a revolution, which also turns the three point stop wheel 135 the same distance thereby carrying the lower point from engagement with spur 62ᵇ and the upper point into engagement with the arm 56 and returning the clutch 46 to engagement with the low speed gear. These movements will be repeated successively at each corner of the guide plate during each operation of the sewing machine.

On completion of a sewing operation the cuff clamp is started forward in the clamp carriage drawing the threads lengthwise of the needle plate and consequently above the open jaw of the thread cutter. Immediately upon the cuff passing the edge of the needle plate, the lug 267 on the carriage (Figs. 49 and 83) will contact with the roller 265 (Fig. 39) swinging lever 264 upon its pivot 263 operating the jaws of the cutter and throwing them into the position seen in Fig. 65 to sever the threads.

In the advance of the clamp carriages the roller-supporting shafts pass between the members 1 and 1ª of the guide base, in the space 10, so as to engage the cam drum. The swinging tooth links 18 and 19 of the gear rack permits the passage therethrough without obstruction and the springs cause them to immediately return to working position.

Having now described my invention what I claim and desire to secure by Letters Patent, is—

1. In an automatic sewing machine, in combination, a two-part supporting base member provided with a guideway, means for automatically moving the parts of said base member to and from each other, a traveling sewing machine having a part adapted to move in said guideway, means for turning said sewing machine bodily around a corner of said supporting base, and operating connections between said sewing machine and said supporting base, whereby the operation of said sewing machine also operates to cause it to travel bodily around said supporting base.

2. In a device of the character described, a base, an angular track formed in the face thereof adapted to embrace upon two or more sides an article to be sewed, a sewing machine operating above the base, a guide member fixed to the base of the machine and moving in said track, means for causing the machine to reciprocate in said track, means for changing its direction at each angle of the track and means for varying its rate of movement along its course, for preserving a uniformity in the length of the stitch.

3. In a sewing machine, a base plate, a transverse track formed in the face thereof near each end, a longitudinal track communicating therewith, a sewing machine slidably mounted on the base plate, a guide bar adapted to move in said tracks and means for conveying the sewing machine from each transverse track to the longitudinal track.

4. In a sewing machine, a base plate, a recess formed in the upper face at each end near the front side thereof, a turn-table having a central slideway in its face, located in each recess, a transverse slideway in the base leading to each recess, a longitudinal slideway connecting the recesses, a sewing machine operating above the base plate, a guide bar fixed to the base of the sewing machine and adapted to move in said slideways, and means for controlling the turntables for causing them to register with their respective communicating slideways.

5. In a sewing machine, a base plate, a turntable having a track in its upper face, located at each end thereof, a track leading from one edge of the plate to each turntable, a track leading from one turntable to the other, a sewing machine having a guide bar fixed in its base adapted to move in said track and means for operating the turntable whereby the sewing machine may be conveyed from one portion of the track to the other.

6. In a device of the character referred to, a supporting base having formed in its face a guide-way and around its edges provided with gear teeth, a sewing machine having a part adapted to move in said guide-way and provided with a gear adapted to said gear teeth around the edge of said base, and means for operating said sewing machine and said gear, whereby the operation of said sewing machine causes it to be moved bodily along the course of said guide-way.

7. In a device of the character referred to, a supporting base provided in its face with a guide-way extending across its ends and longitudinally thereof, a traveling sewing machine mounted to move thereon and having a part adapted to said guide-way, a revolving driving member upon said sewing machine adapted to have interfitting driving connections with said base, whereby to propel the sewing machine bodily, means for operating said sewing machine and said revolving driving member, and means for automatically reversing the direction of rotation of said revolving driving member, whereby to reverse the direction of travel of said sewing machine.

8. In a device of the character referred to, in combination, a base plate provided with a guide-way therein and with gear teeth around its edges, a traveling sewing machine having a part adapted to said guide-way and moving therein, and provided with a gear adapted to the gear teeth around the edge of said base plate, means for operating said sewing machine and said gear, means for reversing the direction of said gear, whereby to propel said machine in opposite directions, and means for automatically changing the speed of travel of said sewing machine around corners, during the operation thereof.

9. In a device of the character described, a base plate comprising two members adjustably secured together, an end track leading from the rear across the face of each member, a track in each member communicating with its respective end track and registering therewith, a sewing machine mounted to travel in said tracks, gear teeth formed about the front side and end of each member, a tooth link connecting the two members and means operated by the sewing machine engaged with said teeth for causing the sewing machine to traverse said track.

10. In a device of the character described, a base plate comprising two members adjustably secured together, an end track leading from the rear across the face of each member, a track in each member communicating with its respective end track and registering therewith, a sewing machine mounted to travel in said tracks, gear teeth formed about the front side and end of each member, toothed links lying in register with each other and each pivoted to its respective member and adapted to swing outwardly uniting the members, means for holding the links in working position and means operated by the sewing machine engaged with said teeth for causing the sewing machine to traverse said tracks.

11. In a device of the character described, a base plate comprising two members adjustably secured together, an end track leading from the rear across the face of each member, a track in each member communicating with its respective end track and registering therewith, a sewing machine mounted to travel in said tracks, gear teeth formed about the front side and end of each member, toothed links lying in register with each other and each pivoted to its respective member and adapted to swing outwardly uniting the members, means for holding the links in working position and means for automatically varying the rate of movement of the machine about the base plate, so as to afford a uniform rate of the stitching mechanism.

12. In a sewing machine, a main frame, a guide plate mounted transversely at an intermediate point thereon, a sewing machine mounted to reciprocate on the guide plate, means for reciprocating the sewing machine, a series of carriers mounted to travel lengthwise around said frame, and means for moving each carrier intermittently and independently of the other carriers.

13. A sewing machine comprising a main frame, a guide-plate mounted transversely at an intermediate point thereon, a sewing machine mounted to reciprocate on the guide-plate, means for reciprocating the sewing machine, carriers mounted to travel longitudinally around said frame, means for bringing each carrier to loading position adjacent the upper edge and near one end of the frame, means for arresting each carrier at sewing position without arresting the movement of the others, and means for delivering the load at the opposite end of the frame.

14. In a sewing machine, a main frame, a guide-plate mounted transversely at an intermediate point thereon, a sewing machine mounted to reciprocate on the guide-plate, carriers each having upper and lower jaws mounted to travel longitudinally around the frame, spring arms secured to the rear edges of said jaws and projecting forwardly intermediate thereof to support the members of the article to be sewed, means for arresting each carrier in loading position adjacent the upper face of the frame, means for bringing the carrier to and arresting it at the sewing position, means for moving the carriage to the opposite end of the frame, means for opening said jaws, and means for removing the sewed article from the jaws.

15. In a sewing machine, a main frame, a track formed along its upper and lower faces, a transfer pivoted at each end of the frame adapted to swing into line with either upper or lower face a track along the face of each transfer adapted to register with those in the faces of the frame, and a carriage adapted to travel along said tracks.

16. In a sewing machine, a main frame, a track formed along its upper and lower faces, a transfer pivoted at each end of the frame adapted to swing into line with either upper or lower face, a track along the face of each transfer adapted to register with those in the faces of the frame means for swinging the transfers into engagement with either upper or lower face of the frame, and a carriage adapted to travel along said tracks.

17. In a sewing machine, a main frame, a track formed along its upper and lower faces, a transfer pivoted at each end of the frame adapted to swing into line with either upper or lower face, a track along the face of each transfer adapted to register with those in the faces of the frame, a cam drum mounted centrally in said frame, a toothed rack mounted in each end of the frame and operatively engaged with its corresponding transfer a stud projecting from the rack into a cam groove of the drum, whereby, by the rotation of the drum the transfers may be swung into engagement with either upper or lower face of the frame, and a carriage adapted to travel along said tracks.

18. In a sewing machine, a main frame, a track formed along its upper and lower faces, a transfer pivoted at each end of the frame adapted to swing into line with either upper or lower face, a track along the face of each transfer adapted to register with those in the faces of the frame, a tubular drum having an internal cam groove at each end and a plurality of cam grooves about its outer face mounted centrally in the frame, a tooth rack operatively engaged with each of said transfers mounted in each end of the drum, a stud fixed upon each rack and engaged in its respective groove, a carriage adapted to travel in said tracks and a cam roller depending therefrom adapted to engage the external grooves of the drum, whereby, by the rotation of the drum the carriage will be caused to advance along said tracks and the transfer at its respective end will simultaneously swing into line therewith to receive the carriage to convey it to the track in the opposite side of the frame.

19. In a sewing machine, a main frame, a track formed along its upper and lower faces, a transfer pivoted at each end of the frame adapted to swing into line with either upper or lower face, a track along the face of each transfer adapted to register with those in the faces of the frame, a carriage traveling in said track, means for causing the carriage to move along one of said tracks into its respective transfer and means for causing the carriage to move from the transfer to the succeeding track.

20. In a sewing machine, a main frame, a guide-plate mounted transversely at an intermediate point thereof, a sewing machine mounted to reciprocate on the guide-plate, carriers mounted to travel longitudinally around said frame, means for bringing each carrier to loading position adjacent the upper edge of the frame, means for halting the carrier at sewing position, means for driving the sewing machine along one half its cycle to sew the article in said carrier and means for moving the carriage to discharge position.

21. In a sewing machine, a main frame, a guide-plate mounted transversely at an intermediate point thereof, a sewing machine mounted to reciprocate on the guide-plate, a plurality of carriers mounted to travel longitudinally about said frame across the guide-plate, means for bringing each carrier to loading position adjacent the upper edge of the frame, means for arresting the carrier in sewing position over said plate, means for successively moving the carrier to discharge position and means for driving the sewing machine through one half its cycle during each such period of arrested motion for sewing the article held by the carriage.

22. In a sewing machine, a main frame, a track formed along its upper and lower faces, a transfer pivoted at each end of the frame adapted to swing into line with either upper or lower face, a track along the face of each transfer adapted to register with those in the faces of the frame, a carriage traveling in said tracks, means for causing the carriage to move along one of said tracks into its respective transfer, means for causing the carriage to move from the transfer to the succeeding track and means for automatically locking the carriage in the transfer when disengaged from the frame and for releasing it when the transfer again engages the frame.

23. In a device of the character described, a guide-base, gear teeth about the edges and corners thereof, a sewing machine mounted to reciprocate on the base and operatively connected with the gear teeth, means for operating the machine, and means for automatically changing the gearing of the machine at each corner of the base so as to preserve a uniform feed rate of the sewing machine.

24. In a device of the character described, a guide base, gear teeth about the edge thereof, a sewing machine mounted to reciprocate on the base and operatively connected with the gear teeth, a high speed gearing mounted on the machine and adapted to engage the driving mechanism, means at the beginning of each curve in the gear teeth for throwing the high speed gearing in mesh and means at the end of the curve for restoring the low gearing.

25. In a device of the character described, a guide-base, gear teeth along the front side and the ends thereof, a sewing machine adapted to travel in said guide base and operatively connected with said gear teeth, means for operating the machine to cause it to traverse said base and means for automatically disengaging the operative mechanism at the limit of travel of the sewing machine.

26. In a device of the character described, a guide-base, gear teeth along the ends and front side thereof, a sewing machine adapted to travel in said guide-base and operatively connected with said gear teeth, means for operating the machine, to cause it to traverse said base, means for disengaging the operative mechanism at the limit of travel of the sewing machine and means for automatically arresting the motion of the sewing machine.

27. In a device of the character described, a guide-base, gear teeth along the ends and front side thereof, a sewing machine adapted to travel in a track in said guide-base and operatively connected with said gear teeth, means for operating the machine to cause it to traverse said base, means for disengaging the operative mechanism at the limit of travel of the sewing machine, means for automatically arresting the motion of the sewing machine and means for automatically reversing the operative mechanism to return the sewing machine along said track.

28. In a device of the character described, a guide-base, gear teeth along the ends and front side thereof, a sewing machine adapted to travel in said guide-base and operatively connected with said gear teeth, means for operating the machine to cause it to traverse said base, means for disengaging the operative mechanism at the limit of travel of the sewing machine, means for arresting the motion of the sewing machine, means for reversing the operative mechanism and means for automatically releasing the stop mechanism to set the machine in motion.

29. In a device of the character described, a guide base, gear teeth along the ends and front side thereof, a sewing machine adapted to travel in said guide-base and operatively connected with said gear teeth, means for operating the machine to cause it to traverse said base, means for disengaging the operative mechanism at the limit of travel of the sewing machine, means for arresting the motion of the sewing machine, means for reversing the operative mechanism, means for automatically releasing the stop mechanism to set the machine in motion and means for placing the operative mechanism in gear.

30. In a device of the character described, a base, a track consisting of a series of sections formed in the face thereof, a sewing machine operating above the base, a guide member secured to the base of the sewing machine and engaged in said track, means for causing the sewing machine to reciprocate with said guide member, and a turntable for transferring the sewing machine from each section to the adjacent section.

31. In a device of the character described, a base, a track composed of fixed and movable portions formed in the face thereof, a sewing machine mounted to travel in said track, a clutch comprising a longitudinally shiftable shaft traveling about said base, a driven clutch member having oppositely disposed working faces fixed upon the shaft, a driving clutch member mounted on the shaft at each side of the fixed member, a high speed gear operatively connecting one of the driving clutch members with the sewing machine, a low speed gear connecting the other driving clutch member with the sewing machine, means for automatically shifting said shaft at the beginning of each straight portion of said track to engage the low speed gear, and means at the beginning of each curved portion of the track to shift said shaft for engaging the high speed gear.

32. In a device of the character described, a base, a track composed of fixed and movable portions formed in the face thereof, a sewing machine mounted to travel in said track, a clutch comprising a longitudinally shiftable shaft traveling about said base, a driven clutch member having oppositely disposed working faces fixed upon the shaft, a driving clutch member mounted on the shaft at each side of the fixed member, a high speed gear operatively connecting one of the driving clutch members with the sewing machine, a low speed gear connecting the other driving clutch member with the sewing machine, a cam element on said base having an upwardly inclined bearing surface corresponding in position to the beginning of each straight portion of said track, a cam element on said base having a downwardly inclined bearing face, corresponding to the beginning of each curved portion of said track, and a cam arm connected with said shaft adapted to engage said cam elements, as the machine moves about said base for shifting the clutch into engagement with the low and high speed gears respectively.

33. In an automatic sewing machine, a base, a track formed in the upper face thereof, a sewing machine having a vertically reciprocating foot-piece and needle bar, means for driving the machine in its track, means at each limit of travel for disengaging the driving mechanism, and means in coöperative relation with the foot-piece and needle bar for arresting the movement of the machine at the limit of travel of the sewing machine and at an instant when said foot-piece and needle bar are in up-position.

34. In an automatic sewing machine, a base, a track formed in the upper face thereof, a sewing machine having a vertically reciprocating foot-piece and needle bar, means for driving the machine in its track, means at each limit of travel for disengaging the driving mechanism, means in coöperative relation with the foot-piece and needle bar for arresting the movement of the machine at the limit of travel of the sewing machine and at an instant when said foot-piece and needle bar are in up-position, and means actuated by the machine for causing a return movement of the sewing machine.

35. In a device of the character described, a base, a track in the face thereof conforming approximately to the shape of an article to be sewed, a sewing machine mounted to be driven back and forth in said track, a driven shaft mounted to travel about the periphery of said base and operatively connected with the sewing machine, a plate mounted to move about said shaft, as a center, an idler carried by the plate at one side of said shaft and a pair of idlers, in train, at the other side, adapted to be alternately placed in engagement with the driving mechanism, a pivoted member having an arm rising to form a stop for the sewing machine, and another arm adapted to engage said plate, and means actuated by the device for shifting said pivoted member to disengage said stop and to impart movement to the sewing machine in the reverse direction.

36. In a device of the character described, a base, a track in the face thereof conforming approximately to the shape of an article to be sewed, a sewing machine mounted to be driven back and forth in said track, a driven shaft mounted to travel about the periphery of said base and operatively connected with the sewing machine, a plate mounted to move about said shaft, as a center, a lock for said plate, a releasing lever for said lock, an idler carried by the plate at one side of said shaft and a pair of idlers, in train, at the other side, adapted to be alternately placed in engagement with the driving mechanism, a pivoted member having an arm rising to form a stop for the sewing machine, and another arm adapted to engage said plate, and means actuated by the sewing machine for shifting said pivoted member to disengage said lock and to impart movement to the sewing machine in the reverse direction.

37. In an automatic sewing machine, a base, a guide-way in the face thereof, a sewing machine having a part adapted to travel in said guide-way, means operated between said sewing machine and said base for propelling said sewing machine bodily along said guide-way, means for automatically starting and stopping said sewing machine at each end of its course of travel, a thread cutter mounted upon and moving with said sewing machine, and means for automatically actuating said thread cutter at the end of each trip of said sewing machine along its course of travel.

38. In an automatic sewing machine, a base, a guide-way formed in the face thereof, gear teeth around the edge thereof, a sewing machine having a part adapted to said guide-way and provided with a propelling gear adapted to said gear teeth around the edge of said base, means for operating said sewing machine and said propelling gear, whereby to bodily move said sewing machine along said guide-way during its operation, means at each limit of travel for automatically reversing the direction of said propelling gear, whereby to change the direction of travel of said sewing machine, a thread cutter carried by said sewing machine, means for automatically operating said thread cutter at each end of the course of travel of said sewing machine, and means for automatically starting and stopping said sewing machine at each end of its course of travel, substantially as described.

39. In a device of the character described a base plate provided with angularly disposed grooves, a sewing machine slidably mounted on the base plate and having a needle operatively disposed, a guide lug attached to the sewing machine below the needle, and adapted to engage and slide in the guide grooves, a spur gear rack mounted on the base plate, so that its pitch line is equidistant from the groove throughout its length, a driving pinion revolubly mounted on the sewing machine and adapted to engage the rack for the purpose of propelling the machine along its course, and automatic means for altering the speed of the pinion at the turning points of the guide grooves, so as to maintain a uniform traveling speed for the needle.

40. In a device of the character described a base plate provided with angularly disposed grooves, a sewing machine slidably mounted on the base plate and having a needle operatively disposed, a guide lug attached to the sewing machine below the needle, and adapted to engage and slide in the guide grooves, a spur gear rack mounted on the base plate, so that its pitch line is equidistant from the groove throughout its length, a driving pinion revolubly mounted on the sewing machine and adapted to engage the rack for the purpose of propelling the machine along its course, and a gear shifting mechanism adapted to alter the speed of the pinion at the turning points of the guide groove, so as to maintain a uniform traveling speed for the needle.

In testimony whereof I affix my signature in presence of two witnesses.

OMAR A. WHEELER.

Witnesses:
G. B. NISSEN,
HAZEL ARMSTRONG.